(12) United States Patent
Irvin, Sr.

(10) Patent No.: US 10,790,723 B2
(45) Date of Patent: Sep. 29, 2020

(54) DISK-PACK TURBINE

(71) Applicant: QWTIP LLC, Park City, UT (US)

(72) Inventor: Whitaker Ben Irvin, Sr., Park City, UT (US)

(73) Assignee: QWTIP LLC, Park City, UT (US)

( * ) Notice: Subject to any disclaimer, the term of this patent is extended or adjusted under 35 U.S.C. 154(b) by 1192 days.

(21) Appl. No.: 13/783,037

(22) Filed: Mar. 1, 2013

(65) Prior Publication Data

US 2014/0070541 A1 Mar. 13, 2014

Related U.S. Application Data

(63) Continuation-in-part of application No. 13/213,452, filed on Aug. 19, 2011, now Pat. No. 9,605,663.
(Continued)

(51) Int. Cl.
*H02K 7/18* (2006.01)
*F03G 7/00* (2006.01)
(Continued)

(52) U.S. Cl.
CPC ........... *H02K 7/1823* (2013.01); *B01D 35/06* (2013.01); *B01D 45/12* (2013.01); *B01D 45/14* (2013.01); *B01D 47/16* (2013.01); *B01D 53/24* (2013.01); *B03C 3/00* (2013.01); *B04B 1/04* (2013.01); *B04B 5/12* (2013.01); *F03G 7/00* (2013.01);
(Continued)

(58) Field of Classification Search
CPC ..... F03G 7/00; F03G 7/10; F04D 5/00; F04D 5/001; F04D 17/161; B03C 3/00; B03C 2201/00; B03C 2201/16; B03C 2201/22; B04B 1/04; B04B 5/12; B01D 45/12;
(Continued)

(56) References Cited

U.S. PATENT DOCUMENTS 699,636 A 5/1902 Thrupp
1,061,142 A 5/1913 Tesla
(Continued)

FOREIGN PATENT DOCUMENTS

EP 0101770 A1 3/1984
EP 1898100 A1 8/2006
(Continued)

OTHER PUBLICATIONS

Coats, Callum, "Living Energies," 2001, pp. 107-117, 156-192, 197-200, and 275-293.
(Continued)

*Primary Examiner* — Christopher Verdier
(74) *Attorney, Agent, or Firm* — Cahn & Samuels, LLP

(57) ABSTRACT

A system and method in at least one embodiment for separating fluids including liquids and gases into subcomponents by passing the fluid through a vortex chamber into an expansion chamber and then through at least a portion of a waveform pattern present between at least two rotors and/or disks. In further embodiments, a system and method is offered for harnessing fields created by a system having rotating rotors and/or disks having waveform patterns on at least one side to produce current within a plurality of coils. In at least one embodiment, the waveform patterns include a plurality of hyperbolic waveforms axially aligned around a horizontal center of the system.

20 Claims, 21 Drawing Sheets

Related U.S. Application Data

(60) Provisional application No. 61/376,438, filed on Aug. 24, 2010.

(51) Int. Cl.

| | | |
|---|---|---|
| *B01D 47/16* | (2006.01) | |
| *B01D 45/12* | (2006.01) | |
| *B04B 1/04* | (2006.01) | |
| *F04D 5/00* | (2006.01) | |
| *B03C 3/00* | (2006.01) | |
| *B01D 53/24* | (2006.01) | |
| *B01D 35/06* | (2006.01) | |
| *B01D 45/14* | (2006.01) | |
| *B04B 5/12* | (2006.01) | |
| *F03G 7/10* | (2006.01) | |
| *F04D 17/16* | (2006.01) | |

(52) U.S. Cl.
CPC ............. *F04D 5/00* (2013.01); *F04D 5/001* (2013.01); *B01D 2259/814* (2013.01); *B03C 2201/00* (2013.01); *B03C 2201/16* (2013.01); *B03C 2201/22* (2013.01); *F03G 7/10* (2013.01); *F04D 17/161* (2013.01)

(58) Field of Classification Search
CPC ........ B01D 45/14; B01D 47/16; B01D 35/06; H02K 1/2793; H02K 21/24; H02K 27/26
USPC ........... 415/10, 71, 76, 83, 90; 416/3; 96/15, 96/60; 210/222; 310/156.32–156.37, 268
See application file for complete search history.

(56) References Cited

U.S. PATENT DOCUMENTS

| | | | |
|---|---|---|---|
| 1,061,206 A | | 5/1913 | Tesla |
| 1,383,937 A | * | 7/1921 | Guthrie ............... F01D 1/36 415/38 |
| 2,087,834 A | | 7/1937 | Brown et al. |
| 2,514,039 A | | 7/1950 | Downward |
| 2,601,519 A | | 6/1952 | Hardy et al. |
| 3,487,784 A | | 1/1970 | Rafferty et al. |
| 3,632,221 A | | 1/1972 | Uehling |
| 3,664,268 A | | 5/1972 | Lucas et al. |
| 3,731,800 A | | 5/1973 | Timson |
| 4,042,351 A | | 8/1977 | Anderson |
| 4,118,207 A | | 10/1978 | Wilhelm |
| 4,186,554 A | | 2/1980 | Possell |
| 4,201,512 A | | 5/1980 | Marynowski et al. |
| 4,350,236 A | | 9/1982 | Stahluth |
| 4,361,490 A | | 11/1982 | Saget |
| 4,371,382 A | | 2/1983 | Ross |
| 5,146,853 A | | 9/1992 | Suppes |
| 5,215,501 A | | 6/1993 | Ushikoski |
| 5,248,238 A | | 9/1993 | Ishida et al. |
| 5,254,250 A | | 10/1993 | Rolchigo et al. |
| 5,498,329 A | | 3/1996 | Laminen et al. |
| 5,778,695 A | | 7/1998 | Conner |
| 6,116,420 A | | 9/2000 | Horton |
| 6,227,795 B1 | | 5/2001 | Schmoll, III |
| 6,328,527 B1 | | 12/2001 | Conrad et al. |
| 6,517,309 B1 | | 2/2003 | Zaher |
| 6,682,077 B1 | | 1/2004 | Letourneau |
| 6,692,232 B1 | | 2/2004 | Letourneau |
| 6,719,817 B1 | | 4/2004 | Marin |
| 6,873,235 B2 | | 3/2005 | Fiske et al. |
| 6,890,443 B2 | | 5/2005 | Adams |
| 7,074,008 B2 | | 7/2006 | Motonaka |
| 7,341,424 B2 | | 11/2008 | Dial |
| 7,462,945 B2 | | 12/2008 | Baarman |
| 7,489,060 B2 | | 2/2009 | Qu et al. |
| 8,623,212 B2 | | 1/2014 | Irvin, Sr. et al. |
| 8,636,910 B2 | | 1/2014 | Irvin, Sr. et al. |
| 9,469,553 B2 | | 10/2016 | Irvin, Sr. |
| 9,474,991 B2 | | 10/2016 | Irvin, Sr. |
| 9,605,563 B2 | | 3/2017 | Chardonnet et al. |
| 9,605,663 B2 | * | 3/2017 | Irvin, Sr. ............... F03G 7/00 |
| 10,463,993 B2 | | 11/2019 | Irvin, Sr. |
| 10,464,824 B2 | | 11/2019 | Irvin, Sr. |
| 2002/0195862 A1 | | 12/2002 | Kelly et al. |
| 2003/0106858 A1 | | 6/2003 | Sharpe |
| 2004/0009063 A1 | | 1/2004 | Polacsek |
| 2004/0159085 A1 | | 8/2004 | Carlsson et al. |
| 2004/0107681 A1 | | 10/2004 | Carlsson et al. |
| 2005/0019154 A1 | | 1/2005 | Dial |
| 2005/0169743 A1 | | 8/2005 | Hicks |
| 2005/0180845 A1 | | 8/2005 | Vreeke et al. |
| 2006/0000383 A1 | | 1/2006 | Nast |
| 2006/0054549 A1 | | 3/2006 | Schoendorfer |
| 2006/0233647 A1 | | 10/2006 | Saunders |
| 2006/0272624 A1 | | 12/2006 | Pettersson |
| 2007/0089636 A1 | | 4/2007 | Guardo, Jr. |
| 2007/0144956 A1 | | 6/2007 | Park et al. |
| 2008/0067813 A1 | | 3/2008 | Baarman et al. |
| 2008/0168899 A1 | | 7/2008 | Decker |
| 2009/0078150 A1 | | 3/2009 | Hasegawa et al. |
| 2009/0200129 A1 | | 8/2009 | Houle et al. |
| 2009/0283007 A1 | | 11/2009 | Taylor |
| 2009/0314161 A1 | | 12/2009 | Al-Alusi et al. |
| 2010/0107647 A1 | | 5/2010 | Bergen |
| 2010/0180854 A1 | | 7/2010 | Baumann et al. |
| 2011/0038707 A1 | | 2/2011 | Blackstone |
| 2011/0266811 A1 | | 11/2011 | Smadja |
| 2011/0285234 A1 | | 11/2011 | Jang |
| 2012/0051908 A1 | | 3/2012 | Irvin, Sr. |
| 2014/0183144 A1 | | 7/2014 | Irvin, Sr. |
| 2014/0209535 A1 | | 7/2014 | Irvin, Sr. |
| 2014/0224722 A1 | | 8/2014 | Irvin, Sr. |
| 2015/0144478 A1 | | 5/2015 | Irvin, Sr. |
| 2018/0003163 A1 | | 1/2018 | Irvin, Sr. |

FOREIGN PATENT DOCUMENTS

| | | |
|---|---|---|
| EP | 1770717 A1 | 4/2007 |
| GB | 1063096 | 3/1967 |
| GB | 1187632 | 4/1970 |
| GB | 1262961 | 2/1972 |
| JP | 2009293984 A | 11/2009 |
| SU | 1625829 A1 | 2/1991 |
| WO | 96/41082 A1 | 12/1996 |
| WO | 2004112938 A1 | 12/2004 |
| WO | 2008054131 A1 | 5/2008 |
| WO | 2009/010248 A2 | 1/2009 |
| WO | 2009024154 A1 | 2/2009 |
| WO | 2009109020 A1 | 9/2009 |
| WO | 2010085044 A2 | 7/2010 |

OTHER PUBLICATIONS

Schauberger, Viktor, translated and edited by Callum Coats, "The Energy Evolution: Harnessing Free Energy from Nature," vol. 4 of the Eco-Technology Series, Mar. 2001, pp. 9-28, 62-63, 104-113, 130-142, 164-195, and 200-203.

Schauberger, Viktor, translated and edited by Callum Coats, "The Fertile Earth: Nature's Energies in Agriculture, Soil Fertilisation and Forestry," vol. Three of Eco-Technology Series, Mar. 2001, pp. 26-29, 39-43, 48-50, 57-68, and 72-74.

GuardianTrader, Genesis Vortex, http://guardiantrader.com/Genesis_Vortex.html, printed Jul. 12, 2011.

Natural Energy Works, "Wasserwirbler (Water Vortex Shower)", http://www.orgonclab.org/cart/yvortex.htm, printed Jul. 12, 2011.

Wikipedia, "Tesla Turbine," http://en.wikipedia.org/wiki/Tesla_turbine, printed Mar. 23, 2010.

Espacenet, English Abstract for JP2009293984 (A), printed Mar. 14, 2013.

Fractal Water, LLC, "Structured water is Fractal Water's Implosion nozzle Vortex", copyrighted 2012, printed on Dec. 28, 2012 from http://www.fractalwater.com/vortex/.

Fractal Water, LLC, "Magnetic Water Treatment with the Fractal Water Super Imploder Magnetics", copyrighted 2012, printed on Dec. 28, 2012 from http://www.fractalwater.com/magnetics/.

(56) References Cited

OTHER PUBLICATIONS

Fractal Water, LLC, "Fractal Water: Vortex Magnetic Systems:: Physics of the Imploder Vortex Nozzle", copyrighted 2012, printed on Dec. 28, 2012 from http://www.fractalwater.com/science/physics-of-the-imploder-vortex-nozzle/.

Fractal Water, LLC, "Buy the Super Imploder from Fractal Water, Vortex Magnetic System", copyrighted 2012, printed on Dec. 28, 2012 from http://www.fractalwater.com/products/imploder-magnetic-water/.

Fractal Water, LLC, "Implosion water structured vortex", copyrighted 2012, printed on Dec. 28, 2012 from http://www.fractalwater.com/products/tri-ploder-vortex/.

Fractal Water, LLC, "Fractal Water: Vortex Magnetic Systems :: Imploder Vortex Shower Head", copyrighted 2012, printed on Dec. 28, 2012 from http://www.fractalwater.com/products/imploder-vortex-shower-head/.

WIPO PCT International Preliminary Report on Patentability, PCT/US2011/048901, dated Feb. 26, 2013.

QWTIP LLC, U.S. Patent Application Publication No. 2018/0126300 A1, published May 10, 2018, Preliminary Amendment, filed Nov. 9, 2018.

QWTIP LLC, U.S. Patent Application Publication No. 2017/0232454 A1, published Aug. 17, 2017, Preliminary Amendment, filed Oct. 31, 2018.

QWTIP LLC, U.S. Patent Application Publication No. 2018/0291124 A1, published Oct. 12, 2017, Preliminary Amendment, filed Oct. 31, 2018.

United States Patent and Trademark Office, U.S. Appl. No. 15/295,732 Office Action, dated Mar. 19, 2019.

United States Patent and Trademark Office, U.S. Appl. No. 15/295,732 Office Action, dated Apr. 1, 2019.

United States Patent and Trademark Office, U.S. Appl. No. 15/331,892 Office Action, dated Apr. 1, 2019.

United States Patent and Trademark Office, U.S. Appl. No. 15/331,892 Office Action, dated May 22, 2019.

U.S. Patent and Trademark Office, Notice of Allowance in U.S. Appl. No. 15/295,732, dated Feb. 10, 2020, p. 3 and Notice of References Cited (document pp. 7 and 9).

U.S. Patent and Trademark Office, Final Office Action in U.S. Appl. No. 15/295,732, dated Oct. 29, 2019, pp. 3-10.

U.S. Patent and Trademark Office, Amendment after Final in U.S. Appl. No. 15/295,732, dated Jan. 29, 2020, pp. 1-12.

\* cited by examiner

First Test Run

| Drive Motor Measurements | First Read | End Read |
|---|---|---|
| Voltage | 84.3 | 84.1 |
| Amperage | 9.53 | 8.62 |
| Watts | 811.8 | 724.9 |
| Turbine RPM | 1127 | 1127 |

| Output Measurements | First Read | End Read |
|---|---|---|
| Voltage | 120.2 | 122.2 |
| Amperage | 17.2 | 15.8 |
| Watts | 2107 | 1930 |

| Load Measurements | First Read | End Read |
|---|---|---|
| Voltage | 120.2 | 122.2 |
| Amperage | 1.1 | 1.1 |
| Watts | 132.4 | 134.4 |
| Turbine RPM | 2248 | 2302 |

| | Pre-Run | Post-Run |
|---|---|---|
| Net Standing Battery Bank | 116.3 V | 116.6 V |
| 1 HP DC motor temperature | 95.7 F | 90.7 F |
| room temperature | 70.8 F | |

FIG. 24A

Second Test Run

| Drive Motor Measurements | First Read | End Read |
|---|---|---|
| Voltage | 82.5 | 82.5 |
| Amperage | 10.17 | 9.74 |
| Watts | 842.5 | 811.3 |
| Turbine RPM | 1076 | 1080 |

| Output Measurements | First Read | End Read |
|---|---|---|
| Voltage | 113.6 | 113.4 |
| Amperage | 9.4 | 3.6 |
| Watts | 1067.84 | 407.1 |

| Load Measurements | First Read | End Read |
|---|---|---|
| Voltage | 112.6 | 113.4 |
| Amperage | 8.3 | 7.4 |
| Watts | 952.8 | 879.6 |
| Turbine RPM | N/A | N/A |

| | Pre-Run | Post-Run |
|---|---|---|
| Net Standing Battery Bank | 115.7 V | 116.3 V |
| 1.5 HP drive motor temperature | 90.1 F | 87.8 F |
| room temperature | 67.8 F | |

FIG. 24B

Third Test Run

| Drive Motor Measurements | First Read | End Read |
|---|---|---|
| Voltage | 83.6 | 83.5 |
| Amperage | 8.59 | 8.28 |
| Watts | 715.6 | 691.3 |
| Turbine RPM | 1107 | 1113 |

| Output Measurements | First Read | End Read |
|---|---|---|
| Voltage | 119.8 | 121 |
| Amperage | 16.5 | 15.4 |
| Watts | 1976.7 | 1863.4 |

| Load Measurements | First Read | End Read |
|---|---|---|
| Voltage | 119.6 | 121.4 |
| Amperage | 0.9 | 0.9 |
| Watts | 107.9 | 108.9 |
| Turbine RPM | N/A | N/A |

| | Pre-Run | Post-Run |
|---|---|---|
| Net Standing Battery Bank | 115.3 V | 116.1 V |
| 1.5 HP drive motor temperature | 85.6 F | 83.8 F |
| room temperature | 69.8 F | |

FIG. 24C

| Item | Original Run Time | Run Time - Test 1 | Run Time - Test 2 | Run Time - Test 3 |
|---|---|---|---|---|
| PlayBook 1 | 5.3 | 5.4 | 9.55 | 6.9 |
| PlayBook 2 | 5.3 | 6.75 | 7.98 | 6.3 |

FIG. 25

DISK-PACK TURBINE

This application is a continuation-in-part application to U.S. application Ser. No. 13/213,452, filed Aug. 19, 2011, which claims the benefit of U.S. provisional Application Ser. No. 61/376,438, filed Aug. 24, 2010. Both of these patent applications are hereby incorporated by reference.

I. FIELD OF THE INVENTION

The present invention relates to a system and method for processing a fluid to dissociate fluid in one or more embodiments and for dissociating components of the fluid in one or more embodiments. More particularly, the system and method of at least one embodiment of the present invention provides rotating hyperbolic waveform structures and dynamics that may be used to controllably affect the fundamental properties of fluids and/or fields for separation of gases and/or power generation.

II. SUMMARY OF THE INVENTION

In at least one embodiment, this invention provides a system including a housing having at least one feed inlet, a vortex chamber in fluid communication with the at least one feed inlet; a plurality of waveform disks in fluid communication with the vortex chamber, the plurality of waveform disks forming an axially centered expansion and distribution chamber; at least one coil array in magnetic communication with the plurality of waveform disks; at least one rotating disk rotatable about the housing, wherein the disk includes an array of magnets; and a drive system engaging the plurality of waveform disks.

In at least one embodiment, this invention provides a system including a vortex induction chamber; a housing in communication with the vortex induction chamber, wherein the housing includes an upper case having a paraboloid shape formed on at least one face, a lower case having a parabolic shape formed on at least one face, and a peripheral side wall connecting the upper case and the lower case such that a paraboloid chamber is formed; an arrangement of disks disposed within the casing, wherein at least one of the disks includes an opening in the center in fluid communication with the vortex induction chamber; and a drive system connected to the arrangement of disks.

In at least one embodiment, this invention provides a system including a vortex induction chamber, a case connected to the vortex induction chamber, the case including a chamber having multiple discharge ports, a pair of rotors in rotational connection to the case, the rotors forming at least a portion of an expansion and distribution chamber, at least one waveform channel exists between the rotors, and a motor connected to the rotors; and a fluid pathway exists from the vortex induction chamber into the expansion and distribution chamber through the at least one waveform channel to the case chamber and the multiple discharge ports.

In at least one embodiment, this invention provides a system including at least one feed inlet; a plurality of waveform disks in fluid communication with the at least one feed inlet, the plurality of waveform disks each having an opening passing therethrough forming an axially centered expansion chamber; at least one coil array in magnetic communication with the plurality of waveform disks; at least one magnet plate rotatable about the feed inlet, wherein the plate includes an array of magnets where one of the at least one coil array is between one of the at least one magnet plate and the plurality of waveform disks; and a drive system engaging the plurality of waveform disks.

In at least one embodiment, this invention provides a system including an intake chamber; a housing connected to the intake chamber, wherein the housing includes an upper case having a paraboloid shape formed on at least one face, a lower case having a paraboloid shape formed on at least one face, and a peripheral side wall connecting the upper case and the lower case such that a chamber that is at least one of a paraboloid and toroid is formed; a disk-pack turbine disposed within the housing, the disk-pack turbine includes at least one disk having an opening in the center in fluid communication with the intake chamber; and a drive system connected to the disk-pack turbine.

In at least one embodiment, this invention provides a system including a vortex induction chamber, a housing connected to the vortex induction chamber, the housing including a chamber having multiple discharge ports, a pair of rotors in rotational connection to the housing, the rotors forming at least a portion of an expansion chamber, disk mounted on each of the rotors, at least one disk chamber exists between the disks, and a motor connected to the rotors; and a fluid pathway exists from the vortex induction chamber into the expansion chamber through the at least one waveform channel to the housing chamber and the multiple discharge ports.

In at least one embodiment, this invention provides a system including a housing having at least one feed inlet, a vortex chamber in fluid communication with the at least one feed inlet; a disk-pack turbine having an expansion chamber axially centered and in fluid communication with the vortex chamber, wherein the disk-pack turbine includes members having waveforms formed on at least one surface; a first coil array placed on a first side of the disk-pack turbine; a second coil array placed on a second side of the disk-pack turbine; an array of magnets in magnetic communication with the disk-pack turbine; and a drive system engaging the disk-pack turbine.

In at least one embodiment, this invention provides a disk array for use in a system manipulating at least one fluid, the disk array including at least one pair of mated disks, the mated disks are substantially parallel to each other, each disk having a top surface, a bottom surface, a waveform pattern on at least one surface of the disk facing at least one neighboring disk such that the neighboring waveform patterns substantially form between the neighboring disks in the pair of mated disks a passageway, at least one mated disk in each pair of mated disks includes at least one opening passing through its height, and a fluid pathway exists for directing fluid from the at least one opening in the disks through the at least one passageway towards the periphery of the disks; and each of the waveform patterns includes a plurality of at least one of protrusions and depressions. In a further embodiment, the number of mated disks includes at least three pairs of mated disks.

In at least one embodiment, this invention provides a method for generating power including driving a plurality of disks having mating waveforms, feeding a fluid into a central chamber defined by openings passing through a majority of the plurality of disks with the fluid flowing into spaces formed between the disks to cause the fluid to dissociate into separate components, and inducing current flow through a plurality of coils residing in a magnetic field created between the waveform disks and at least one magnet platform rotating through magnetic coupling with the waveform disks.

III. BRIEF DESCRIPTION OF THE DRAWINGS

The present invention is described with reference to the accompanying drawings. In the drawings, like reference numbers indicate identical or functionally similar elements. The use of cross-hatching and shading within the drawings is not intended as limiting the type of materials that may be used to manufacture the invention.

Figure 9A:
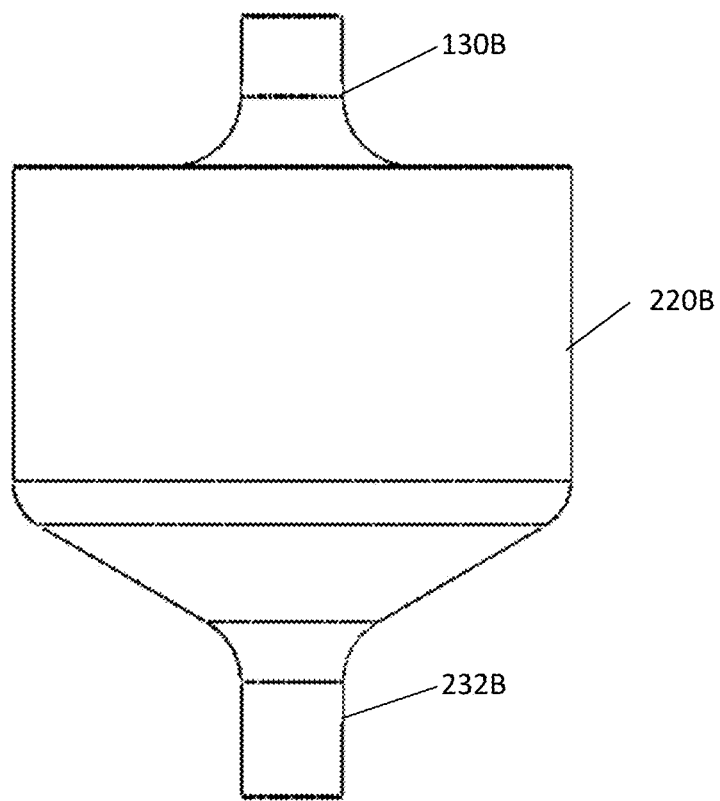
Figure 9B:
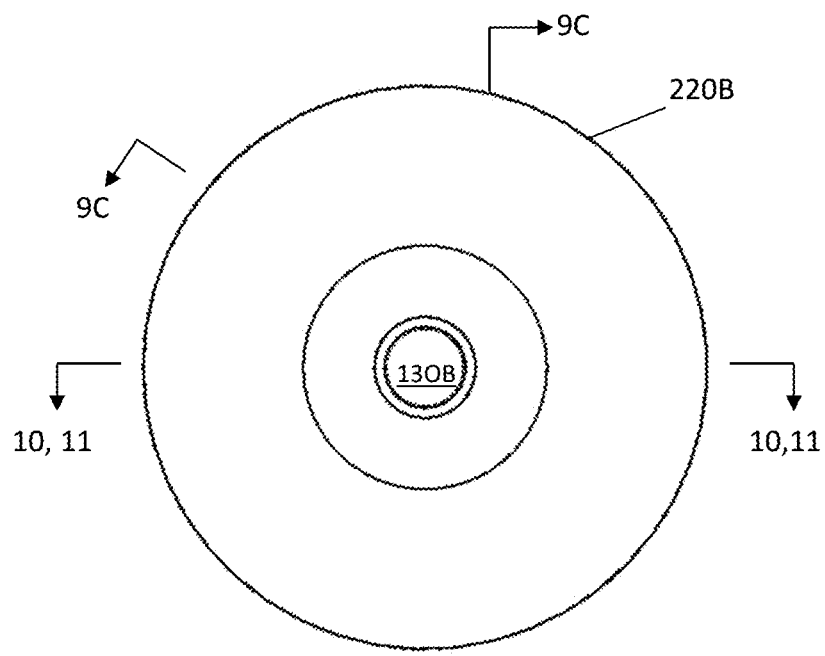
Figure 9C:
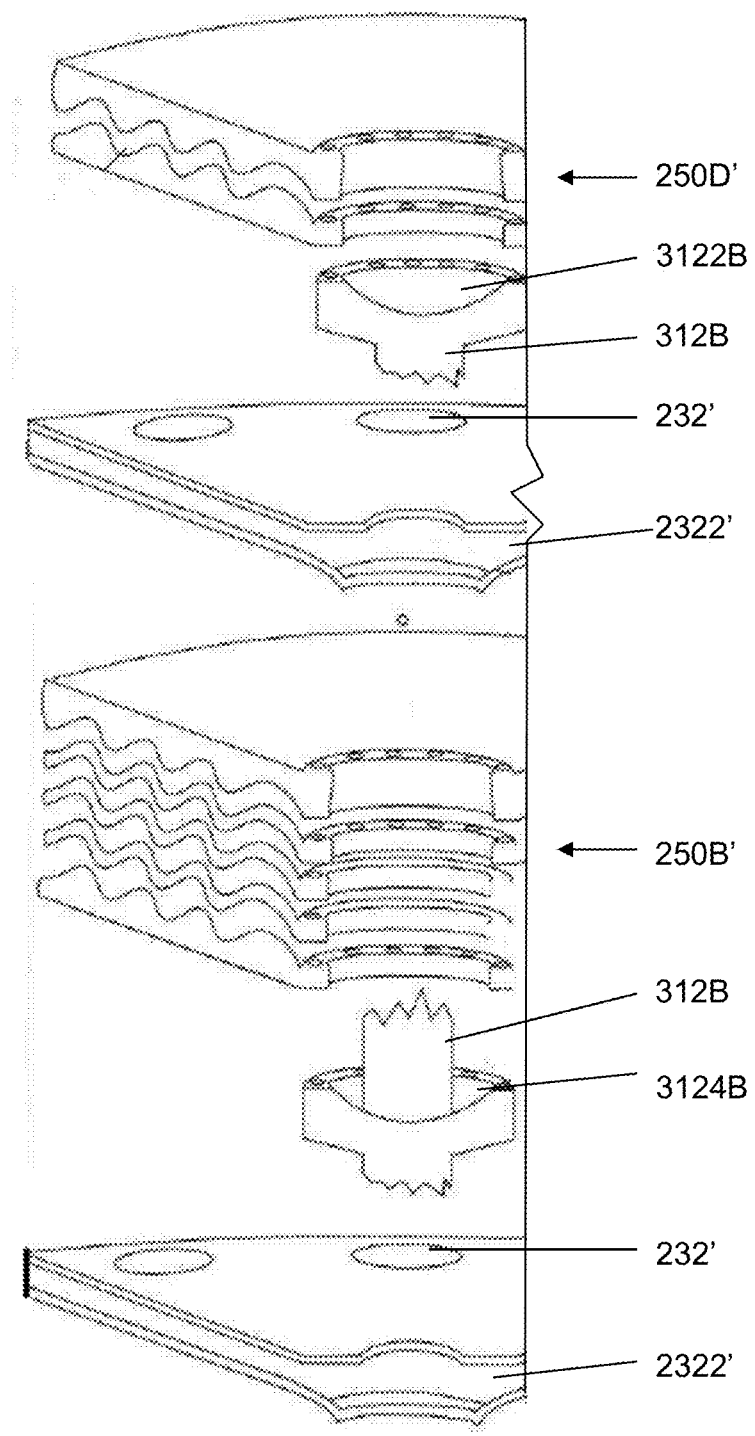

FIG. 9A illustrates a side view of another embodiment according to the invention. FIG. 9B illustrates a top view of the system illustrated in FIG. 9A. FIG. 9C illustrates a partial cross-section of an embodiment according to the invention take at 9C-9C in FIG. 9B.

Figure 10:
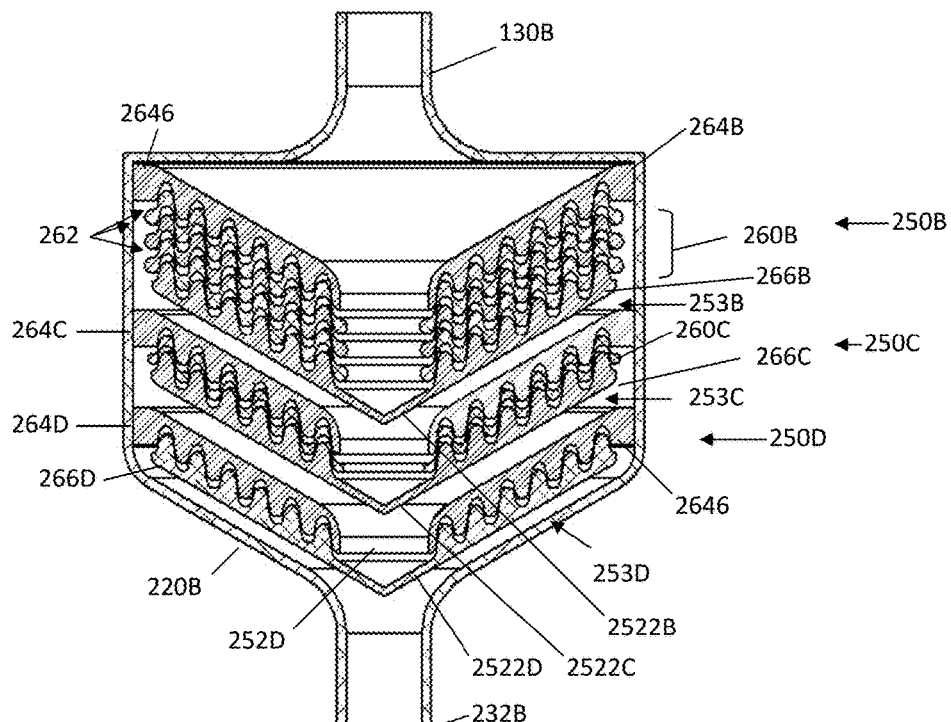

FIG. 10 illustrates a cross-sectional view of the embodiment taken at 10-10 in FIG. 9B.

Figure 11:
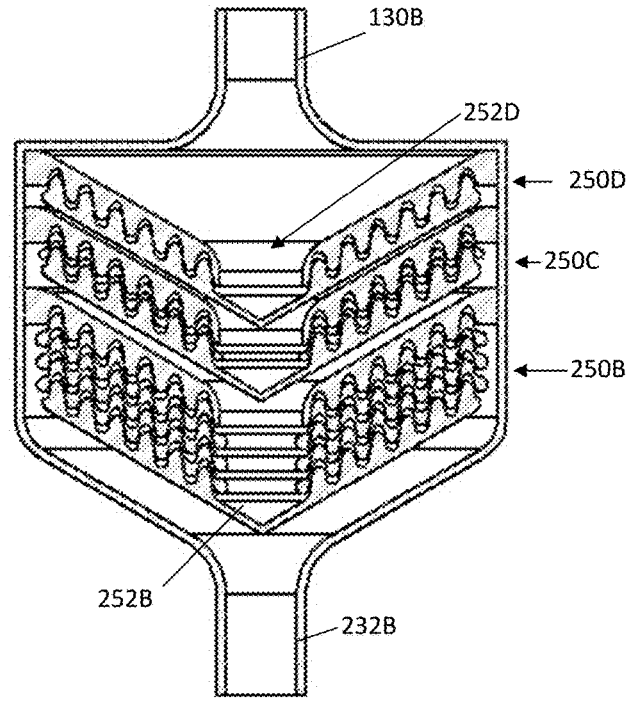

FIG. 11 illustrates a cross-sectional view of the embodiment taken at 11-11 in FIG. 9B.

Figure 12:
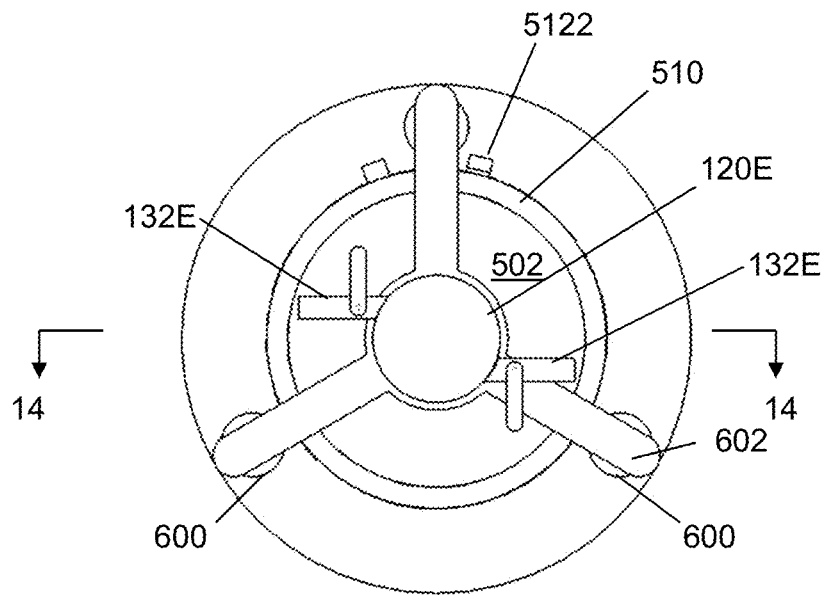

FIG. 12 illustrates a top view of another embodiment according to the invention.

Figure 13:
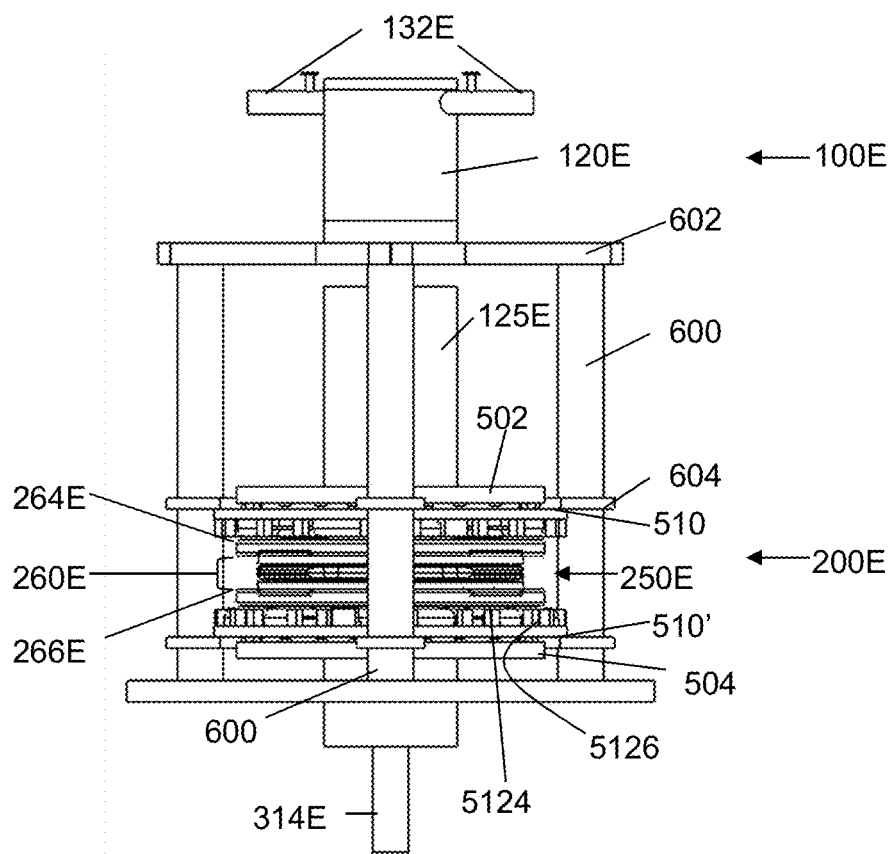

FIG. 13 illustrates a side view of the system illustrated in FIG. 12.

Figure 14:
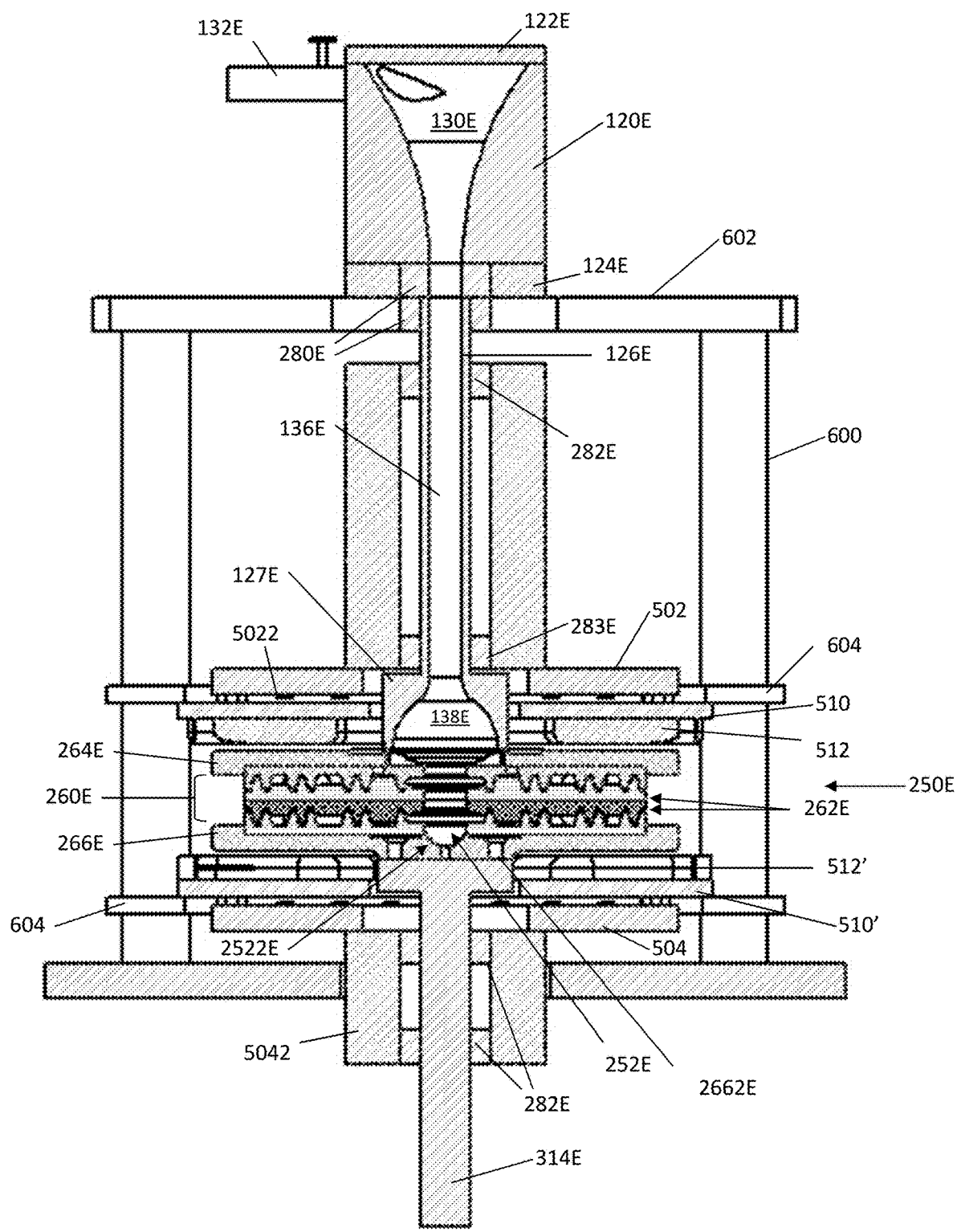

FIG. 14 illustrates a cross-sectional view of the system illustrated in FIG. 12 taken at 14-14 in FIG. 12.

FIGS. 15A-15D illustrate another example disk-pack turbine according to the invention.

Figure 16:
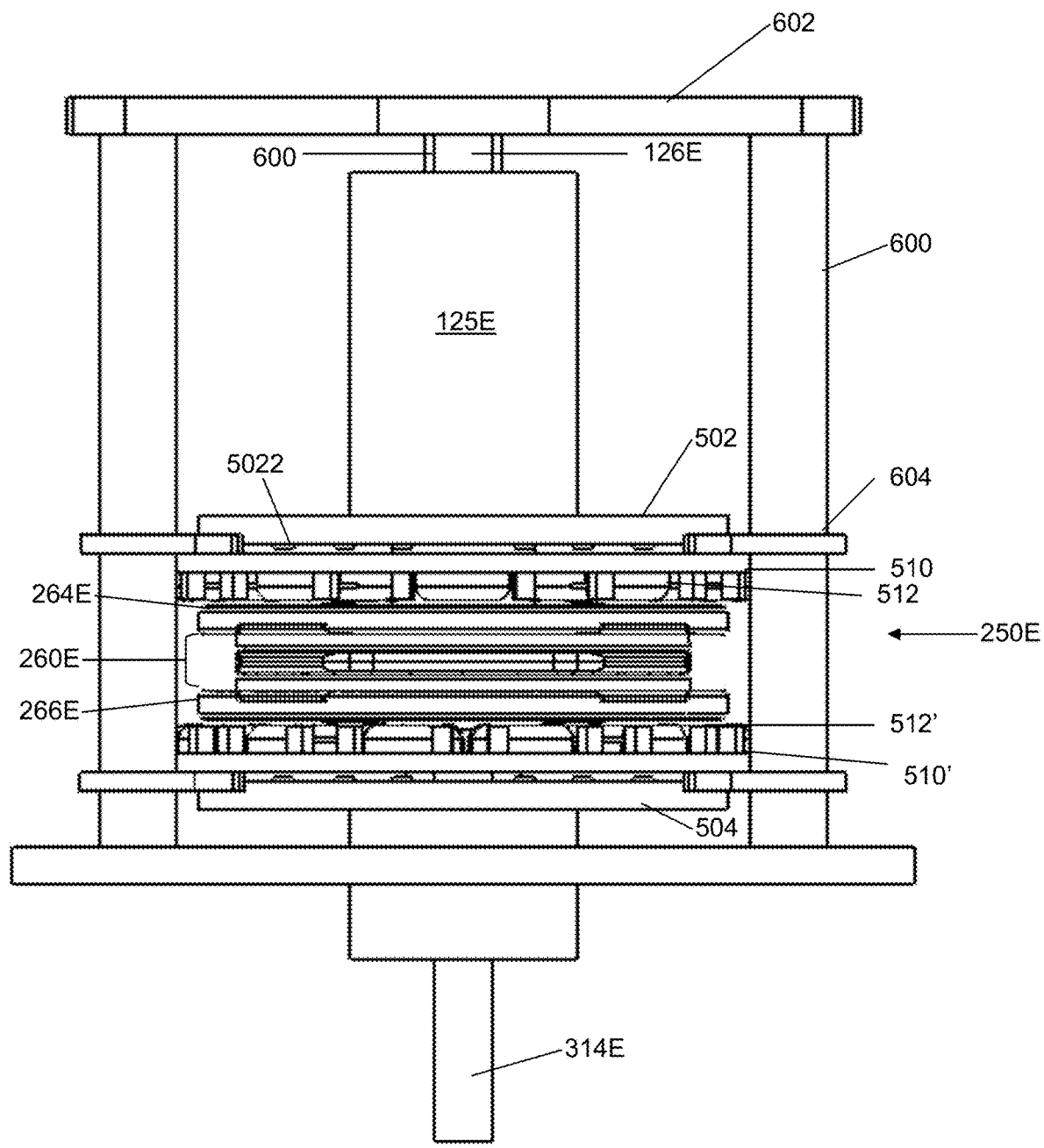

FIG. 16 illustrates a side view of another embodiment according to the invention.

Figure 17:
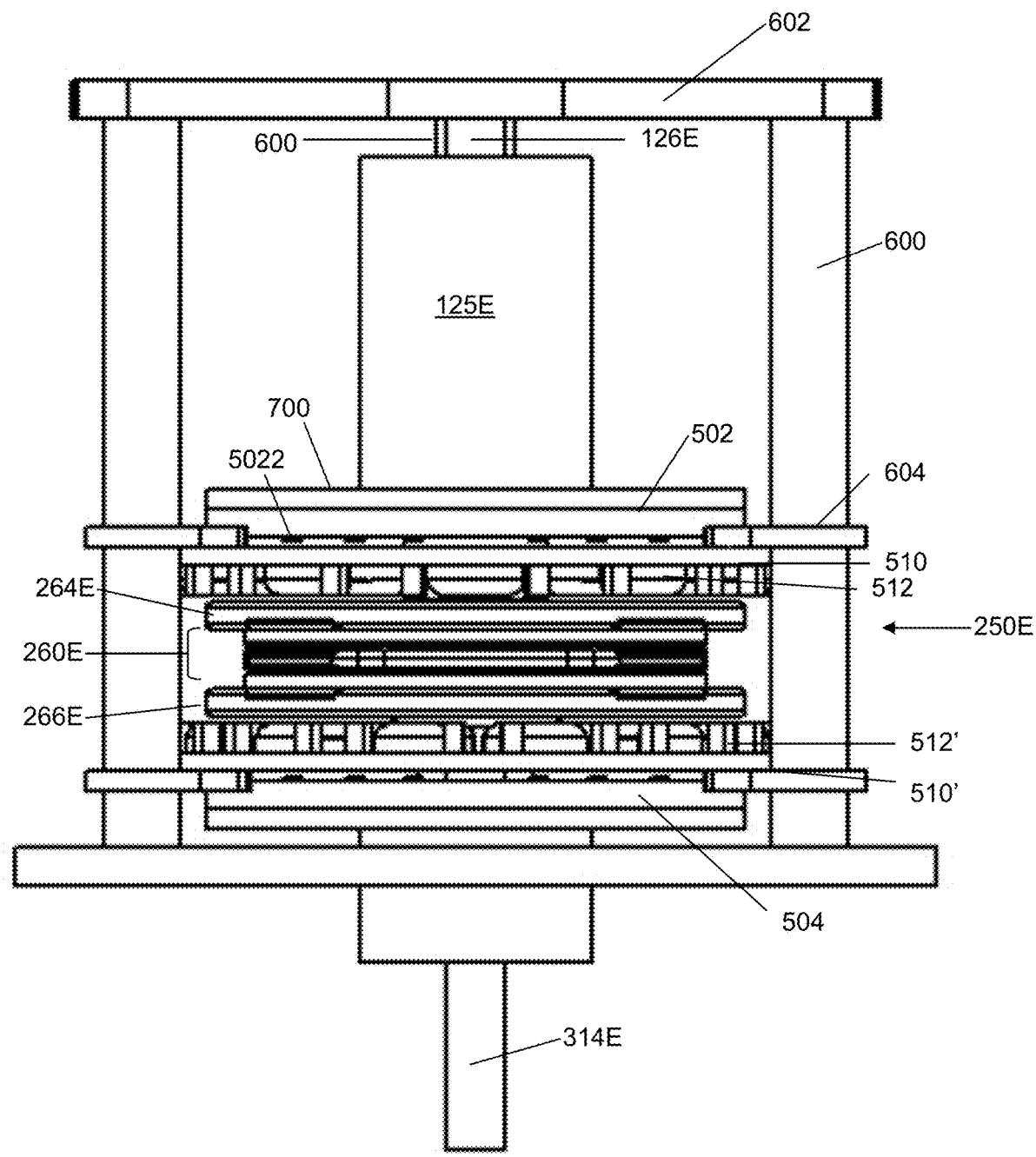

FIG. 17 illustrates a side view of another embodiment according to the invention.

Figure 18:
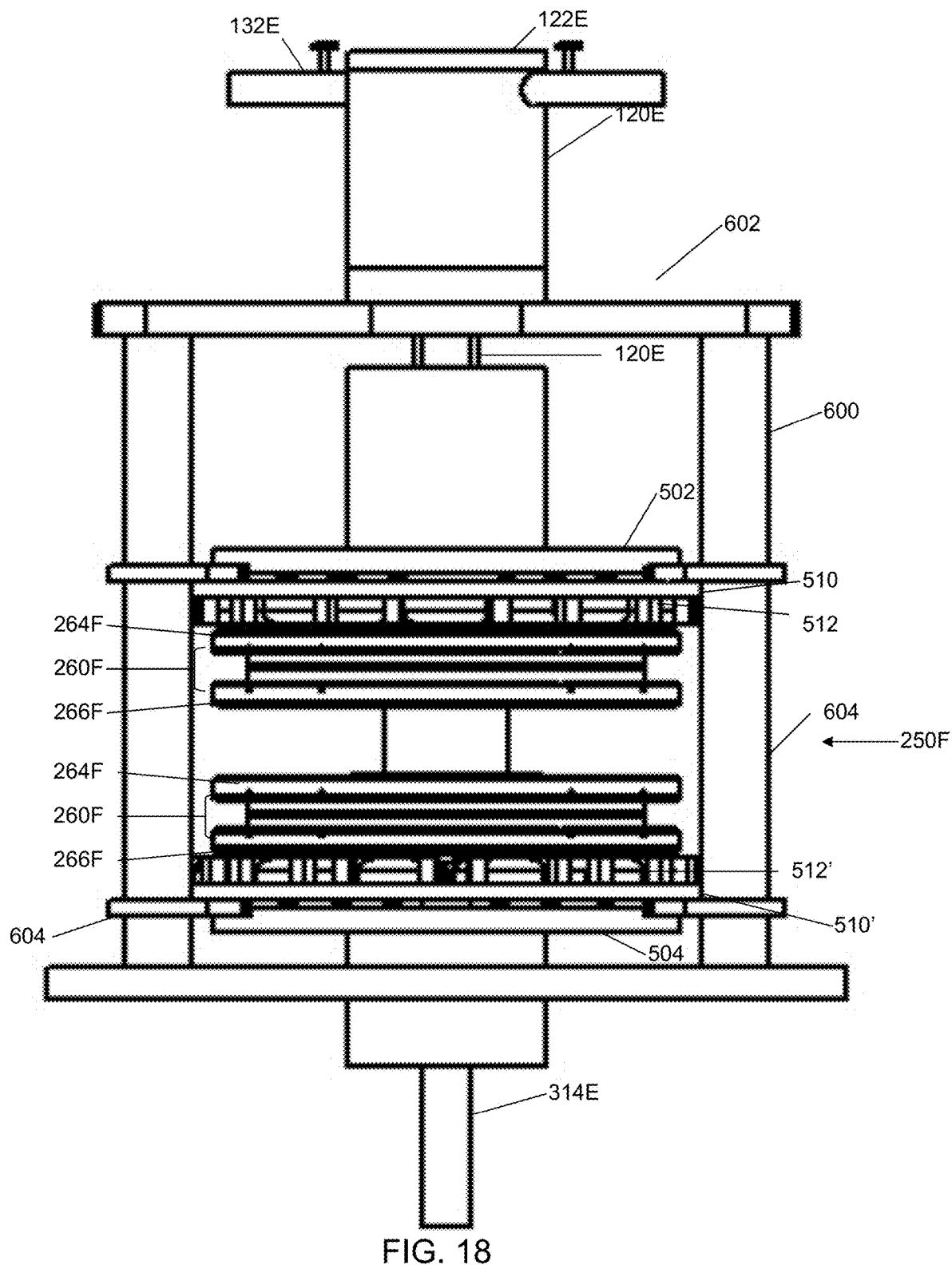

FIG. 18 illustrates a side view of another embodiment according to the invention.

FIGS. 19A-19E illustrate another example disk-pack turbine according to the invention.

Figure 20:
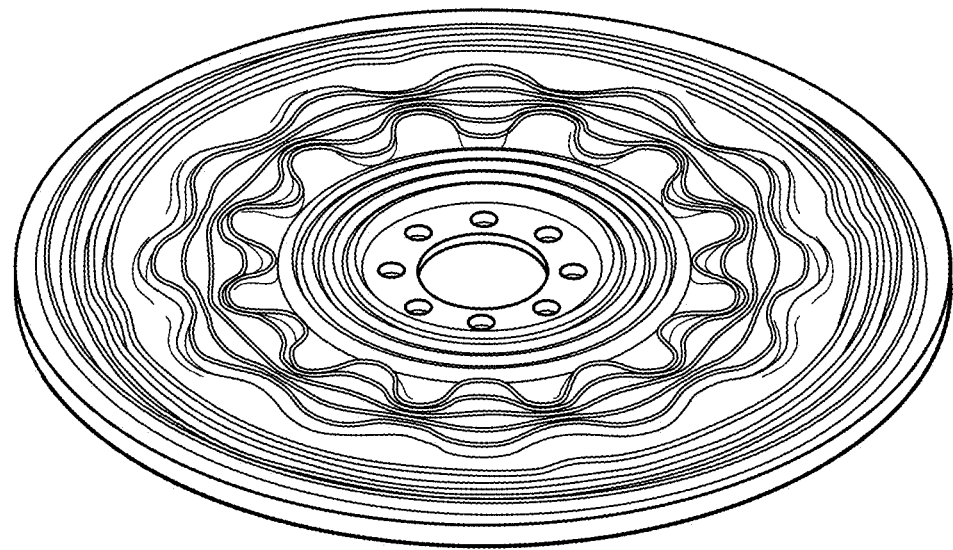

FIG. 20 illustrates a perspective view of another example disk according to the invention.

FIG. 21A-21D illustrate another example disk-pack turbine according to the invention.

Figure 22:
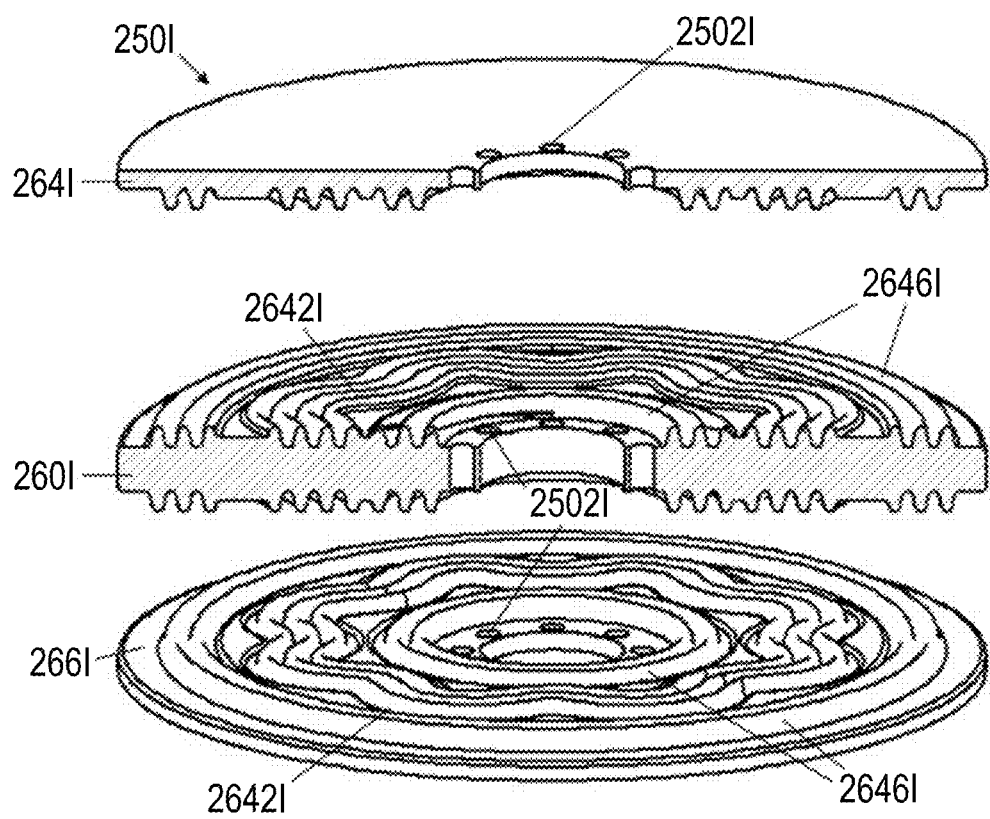

FIG. 22 illustrates another example disk-pack turbine according to the invention.

Figure 23:
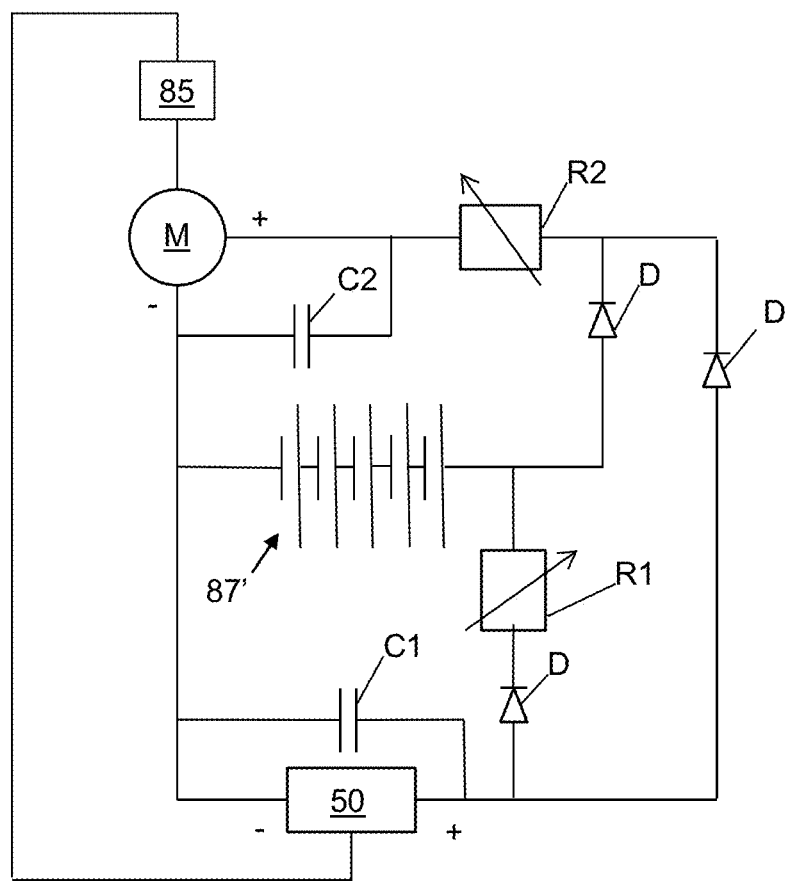

FIG. 23 illustrates a schematic of test flux field generator built to generate power.

FIGS. 24A-24C are tables of data collected as part of testing electrical power generation.

FIG. 25 is a table of data collected as part of testing battery charging.

Given the following enabling description of the drawings, the invention should become evident to a person of ordinary skill in the art.

IV. DETAILED DESCRIPTION OF THE DRAWINGS

The present invention, in at least one embodiment, provides a highly efficient system and method for processing fluid to harness the energy contained in the fluid and the environment and/or to dissociate elements of the fluid to produce electrical energy to drive an electrical generator. In order to accomplish the results provided herein, in at least one embodiment the present invention utilizes rotating hyperbolic waveform structures and dynamics. It is believed these rotating hyperbolic waveform structures and dynamics, in at least one embodiment, are capable of efficiently propagating at ambient temperature and help accomplish many of the functional principles of at least one embodiment of the present invention. More particularly, in at least one embodiment, the system of the present invention is capable of producing very strong field energy at ambient temperatures while using relatively minimal input electrical energy to provide rotational movement to the waveform disks and/or rotors, and in at least one embodiment the disks and/or rotors with a waveform are examples of waveform members. As will be more fully developed in this disclosure in at least one embodiment, the waveform patterns on facing disk surfaces form chambers (or passageways) for fluid to travel through including towards the periphery and/or center while being exposed to a variety of pressure zones that, for example, compress, expand and/or change direction and/or rotation of the fluid particles. Other examples of fluids include, but are not limited to, polar magnetic fluxes and fields which through interaction with the rotating waveform geometry are transmuted to non-north/south magnetic fields with resulting fields being diamagnetic and exclusively repellent and distributed across both outer turbine faces according to the form and distribution of the waveforms within the turbine. This may also result in other embodiments in polar-specific North/South magnetic flux manifesting at the axis and periphery of the turbine. In at least one embodiment, just one waveform disk is present in the system. In a further alternative embodiment to the above embodiments, the system operates in a substantially sealed configuration (or a configuration in which the flow of air into or out of the system is not needed) with no external air being provided to the system where the intake housing is a sealed shaft and the waveform disks have an axially centered opening (although alternatively the waveform disks are solid without the central opening).

In this disclosure, waveforms include, but are not limited to, circular, sinusoidal, multiple axial sinusoidal, biaxial, biaxial sinucircular, a series of interconnected scallop shapes, a series of interconnected arcuate forms, hyperbolic, and/or multi-axial including combinations of these that when rotated provide progressive, disk channels with the waveforms being substantially centered about an axial center of the disk and/or an expansion chamber. Examples of waveform patterns include at least one hyperbolic waveform, at least one biaxial waveform, at least one multiple axial sinusoidal waveform. In at least one embodiment, a substantial portion of the surface of a disk is covered by the waveform pattern. The waveforms are formed, for example but not limited to, by a plurality of ridges (or protrusions or rising waveforms), grooves, and depressions (or descending waveforms) in the waveform surface including the features having different heights and/or depths compared to other features and/or along the individual features. In some embodiments, the height in the vertical axis and/or the depth measured along a radius of the disk chambers vary along a radius. In the illustrated embodiments, each of the plurality of at least one of protrusions and depressions intersect twice with a diameter taken along the surface of the disk on which the waveform pattern is present. When a line is taken in a radial direction along a disk surface having waveforms, the line intersects each ridge and each depression. In some embodiments, the waveforms are implemented as ridges that have different waveforms for each side (or face) of the ridge. In this disclosure, waveform patterns (or geometries) are a set of waveforms on one disk surface. Neighboring rotor and/or disk surfaces have matching waveform patterns that form a channel running from the expansion chamber to the periphery of the disks. In this disclosure, matching waveforms include complimentary waveforms, mirroring geometries that include cavities and other beneficial geometric features. FIGS. 3-5, 7A-7B, 8B, 8C, 9C-11, 14, 15B-15D, and 19A-22 illustrate a variety of examples of these waveforms.

In this disclosure, a bearing may take a variety of forms while minimizing the friction between components with examples of material for a bearing including, but are not limited to, ceramics, nylon, phenolics, bronze, and the like. Examples of bearings include, but are not limited to, bushings and ball bearings. In at least one alternative embodiment, the bearing function uses magnetic fields to center and align rotating components within the system instead of mechanical bearings.

In this disclosure, examples of non-conducting material for electrical isolation include, but are not limited to, non-conducting ceramics, plastics, Plexiglas, phenolics, nylon or similarly electrically inert material. In some embodiments, the non-conducting material is a coating over a component to provide the electrical isolation.

In this disclosure, examples of non-magnetic (or very low magnetic) materials for use in housings, plates, disks, rotors, and frames include, but are not limited to, aluminum, aluminum alloys, brass, brass alloys, stainless steel such as austenitic grade stainless steel, copper, beryllium-copper alloys, bismuth, bismuth alloys, magnesium alloys, silver, silver alloys, and inert plastics. Although non-magnetic materials are used for rotating components, the rotating components have been found to be conductors in some embodiments. Examples of non-magnetic materials for use in bearings, spacers, and tubing include, but are not limited to, inert plastics, non-conductive ceramics, nylon, and phenolics.

In this disclosure, examples of diamagnetic materials include, but are not limited to, aluminum, brass, stainless steel, carbon fibers, copper, magnesium, bismuth, and other non-ferrous material alloys some of which containing high amounts of bismuth relative to other metals.

The present invention in at least one embodiment provides a novel approach to the manipulation and harnessing of energy and matter, resulting in, for example: (a) systems and methods for economical, efficient, environmentally positive separation, expansion, dissociation, combination, transformation, and/or conditioning of liquids and gases for applications such as dissociation of water for energy, elemental restructuring and rendering of pure and complex gases, and the production of highly energetic gases for direct, dynamic application; and (b) systems and methods for the production, transformation, and/or conversion of mass/matter to highly energetic electrical, magnetic, diamagnetic, paramagnetic, kinetic, polar and non-polar fluxes and fields. The present invention provides, in one or more embodiments, systems and methods that are beneficial for electrical power generation.

Figure 1:
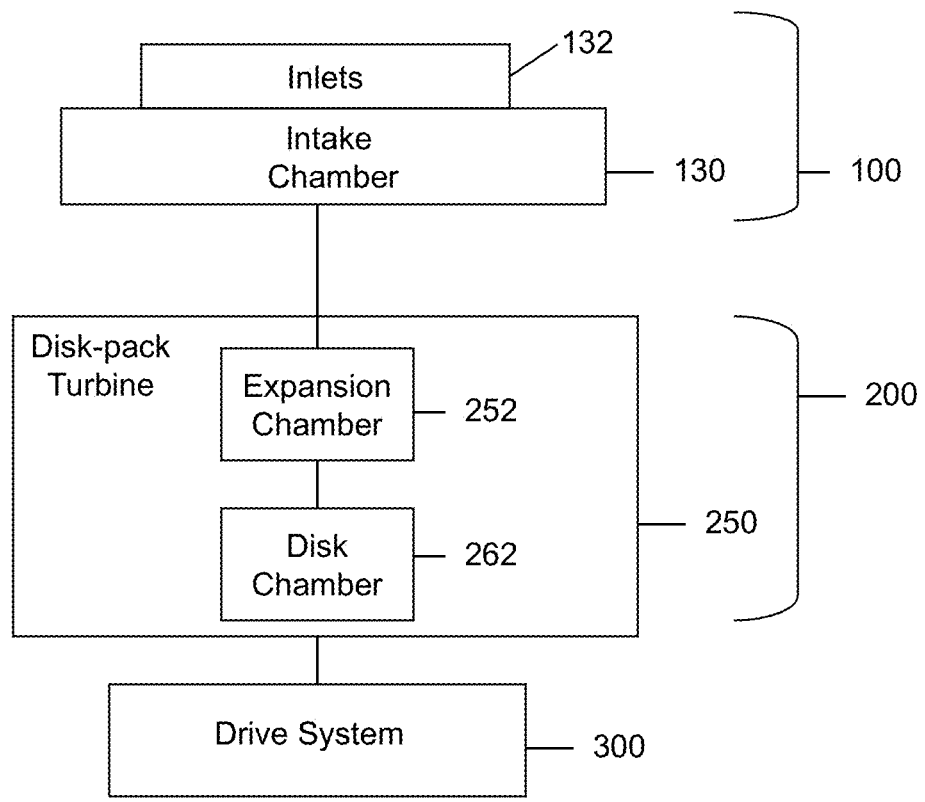
FIG. 1 illustrates a block diagram in accordance with present invention.

The systems and methods of the present invention in at least one embodiment include an intake chamber and a disk-pack turbine having an expansion and distribution chamber (or expansion chamber) in fluid communication with the intake chamber, and disk chambers formed between the rotors and/or disks that form the expansion chamber as illustrated, for example, in FIG. 1. The intake chamber serves to draw charging media, i.e., liquids and/or gases (hereinafter collectively referred to as "fluid" or "media" or "material") into the system before passing the charging media into the expansion chamber. The expansion chamber is formed by two or more stacked rotatable rotors and/or disks having an opening in their center. The stacked rotatable rotors and/or disk(s) are centered axially such that one or more openings are aligned whereby the aligned openings form the expansion chamber. The expansion chamber may include a variety of shapes, ranging from a horizontal substantially cylindrical shape to varying degrees of converging and diverging structures. However, in at least one embodiment, the expansion chamber includes both a convergent structure and a divergent structure designed to first compress, and then expand the media. The disks in at least one embodiment also include one or more patterns of waveform structure which may be highly application specific. In an alternative embodiment, the system draws in fluid from the periphery in addition or in place of the intake chamber.

In some embodiments the intake chamber may be formed as a vortex induction chamber that creates a vertical vortex in the charging media, which in most embodiments is a fluid including liquid and/or gas, in order to impart desired physical characteristics on the fluid. Examples of how the charging media is provided include ambient air, pressurized supply, and metered flow. The vertical vortex acts to shape, concentrate, and accelerate the charging media into a through-flowing vortex, thereby causing a decrease in temperature of the charging media and conversion of heat into kinetic energy. These effects are realized as the charging media is first compressed, then rapidly expanded as it is drawn into the expansion chamber by the centrifugal suction/vacuum created by the dynamic rotation and progressive geometry of the disks. The vortex also assists the fluid in progressing through the system, i.e., from the vortex induction chamber, into the expansion chamber, through the disk chambers formed by the patterns and channels created by the waveforms such as hyperbolic waveforms on the disks, and out of the system. In some embodiments, there may also be a reverse flow of fluid within the system where fluid components that are dissociated flow from the disk chambers to the expansion chamber back up (i.e., flow simultaneously axially and peripherally) through the vortex chamber and, in some embodiments, out the fluid intakes. Media (or material) tends toward being divided relative to mass/specific gravity, with the lighter materials discharging up through the eye of the vortex while simultaneously discharging gases/fluids of greater mass at the periphery. While progressing through the waveform geometries, the charging media is exposed to a multiplicity of dynamic action and reactionary forces and influences such as alternating pressure zones and changing circular, vortex and multi-axial flows of fluid as the fluid progresses over the valleys and peaks and highly variable hyperbolic and/or non-hyperbolic geometries.

The number and arrangement of disks can vary depending upon the particular embodiment. Systemic effects may be selectively amplified by the incorporation of geometries as well as complimentary components and features that serve to supplement and intensify desired energetic influences such as sympathetic vibratory physics (harmonic, sympathetic and/or dissonant, electrical charging, polar differentiation, specific component isolation, i.e., electrical continuity, and magnetism-generated fixed/static permanent magnetic fields, permanent dynamic magnetic fields, induced magnetic fields, etc.). Examples of the various disk arrangements include paired disks, multiple paired disks, stacked disks, pluralities of stacked disks, multi-staged disk arrays, and various combinations of these disk arrangements as illustrated, for example, in FIGS. 3, 7A, 8A-8C, 9C, 10, 11, 15D, 19E, and 22. Further examples add one or more rotors to the disks. A disk-pack turbine is a complete assembly with rotors and/or disks being elements within the disk-pack turbine. In at least one embodiment, the bottom rotor (or disk) includes a parabolic/concave rigid feature that forms the bottom of the expansion chamber.

As the highly energized charging media passes from the vortex induction chamber into the expansion chamber, the charging media is divided and drawn into channels created by the waveforms on the stacked disks. Once within the rotating waveform patterns, the media is subjected to numerous energetic influences, including sinusoidal, tortile, and reciprocating motions in conjunction with simultaneous centrifugal and centripetal dynamics. See, e.g., FIG. 5. These dynamics in at least one embodiment include a multiplicity of multi-axial high pressure centrifugal flow zones and low pressure centripetal flow zones, the majority of which are vortexual in nature.

a. OVERVIEW

FIG. 1 provides a broad overview of an example of a system according to the present invention. This overview is intended to provide a basis for understanding the principles and components of the various embodiments of the present invention that will be discussed in more detail below. The system as illustrated in FIG. 1 includes an intake module 100 with an intake chamber 130 and a disk-pack module 200 having an expansion and distribution chamber (or expansion chamber) 252 and a disk-pack turbine 250. To simplify the discussion, the optional housing around the disk-pack turbine 250 is not included in FIG. 1. The expansion chamber 252 is formed by openings and the recess present in the rotors and/or disk(s) that form the disk-pack turbine 250. See, e.g., FIGS. 3 and 4. The rotatable rotors and/or disks are stacked or placed adjacent to each other such that a small space of separation remains between the adjacent members to form disk chambers. The intake chamber 130 is in fluid communication with the expansion chamber 252. A drive system 300 is connected to the disk-pack turbine 250 to provide rotational movement to the disk-pack turbine 250. In a further embodiment to the above embodiments, the system operates without the active injection of air and/or other material, and in a further embodiment at least a vortex module 100.

The drive system 300 in at least one embodiment is connected to the disk-pack turbine 250 through a drive shaft 314 or other mechanical linkage 316 (see, e.g., FIGS. 4 and 6A) such as a belt, and in a further embodiment the drive system 300 is connected directly to the disk-pack turbine 250. In use, the drive system 300 rotates the plurality of rotors and/or disks in the disk-pack turbine 250. In at least one embodiment, the rotation of which creates a centrifugal suction or vacuum within the system that causes a charging media to be drawn into the intake chamber 130 via inlets 132 and in further embodiments the fluid is drawn in from a periphery of the disk-pack turbine 250.

The intake chamber 130 concentrates (compresses) and passes the charging media into the expansion chamber 252. The expansion chamber 252 causes the compressed charging media to quickly expand and distribute through the disk chambers 262 and over the surfaces of the disk-pack turbine members towards a periphery via the disk chambers 262 and in some embodiments back towards the expansion chamber 252. In at least one embodiment, components of the fluid reverse course through the system, for example, lighter elements present in the fluid that are dissociated from heavier elements present in the fluid. In at least one embodiment, the system includes a capture system for one or more of the dissociated fluid elements. See, e.g., FIGS. 6A and 6B. The media is conditioned as it passes between the rotating disks from the center towards the periphery of the disks. In at least one embodiment, the intake chamber 130 is omitted.

b. FLUID CONDITIONING

Figure 2:
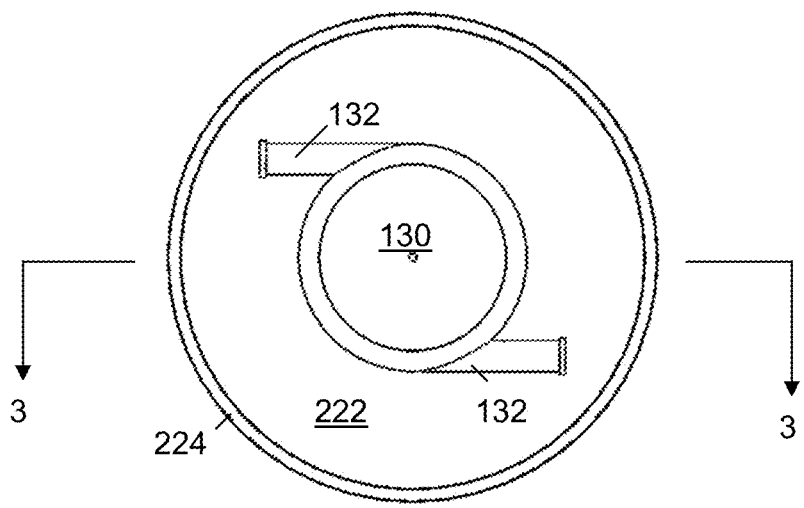
FIG. 2 illustrates a top view of an embodiment according to the invention.
Figure 3:
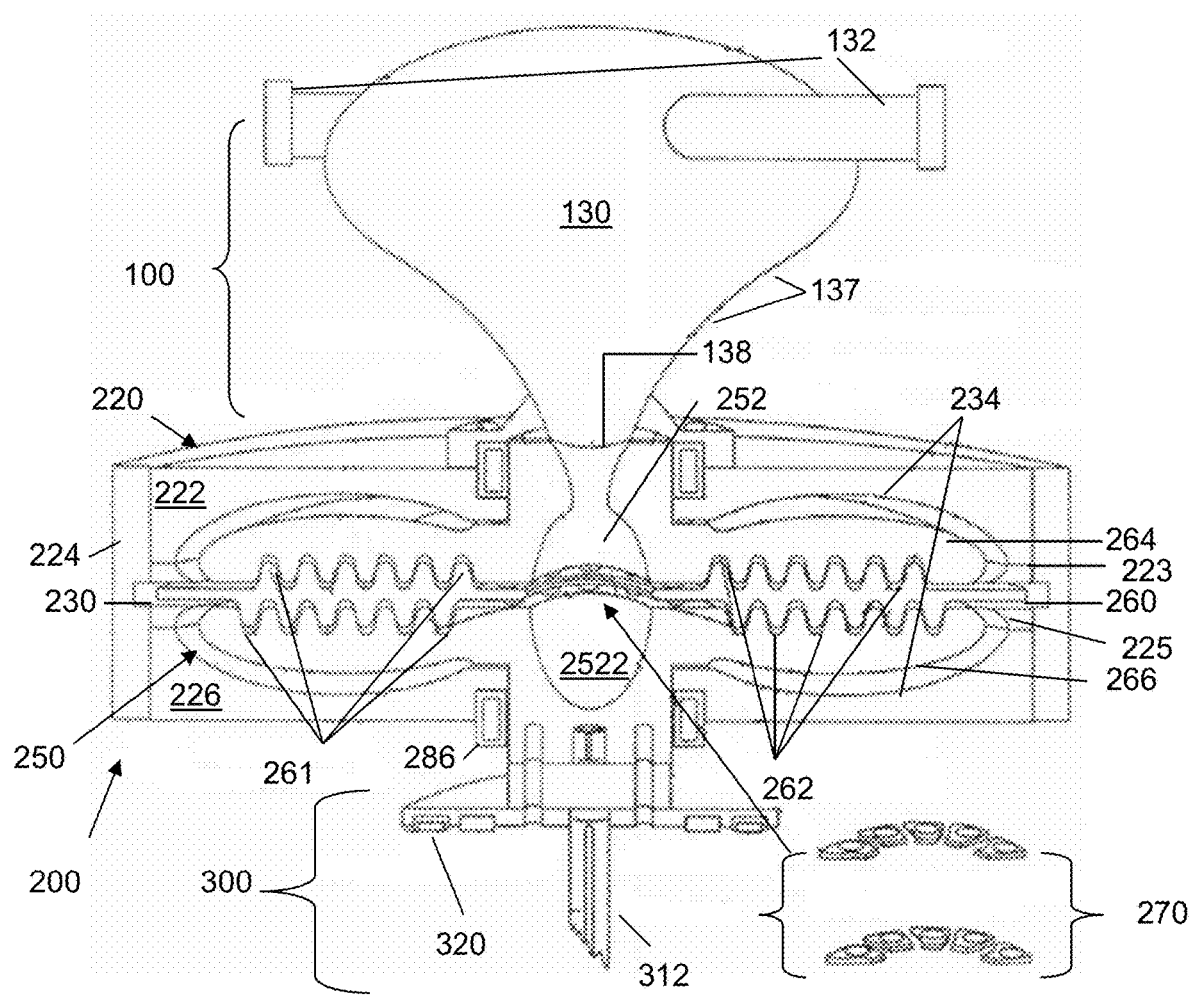
FIG. 3 illustrates a cross-sectional view of the system illustrated in FIG. 2 taken at 3-3.
Figure 4:
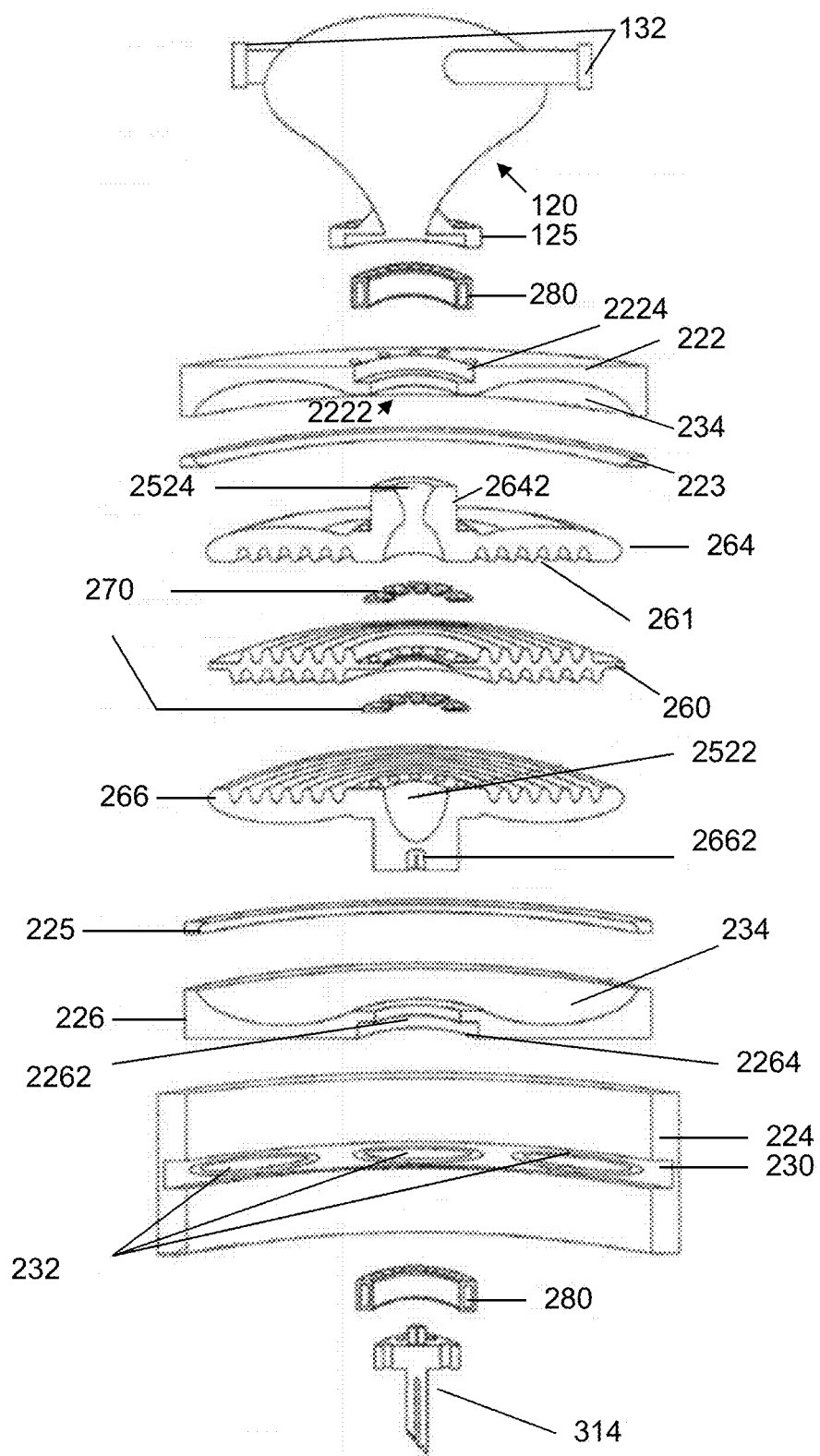
FIG. 4 illustrates an exploded and partial cross-sectional view of the system illustrated in FIG. 2.

FIGS. 2-4 provide various views of an example embodiment of the present invention that is useful in the conditioning, separating, dissociating, and/or transforming liquids, gases and/or other matter. FIGS. 2 and 3 illustrate an embodiment of the fluid conditioning system according to the present invention. In accordance with this embodiment, the system includes a fluid intake module 100 with a vortex induction chamber (or vortex chamber) 130 and a disk-pack module 200 with a housing 220, and a disk-pack turbine 250 with an expansion and distribution chamber (or expansion chamber) 252. The fluid intake module 100 acts as a source of the charging medium provided to the disk-pack module 200.

Charging media enters the vortex chamber 130 via fluid inlets 132. The fluid inlets 132 may also be sized and angled to assist in creating a vortex in the charging media within the vortex chamber 130 as illustrated, for example, in FIG. 2. The vortex chamber 130 provides the initial stage of fluid processing. The housing 220 illustrated in FIGS. 3 and 4 is around the disk-pack turbine 250 and is an example of how to collect fluid components that exit from the periphery of the disk chambers 262.

FIGS. 3 and 4 illustrate, respectively, a cross-section view and an exploded view of the fluid conditioning system in accordance with an embodiment illustrated in FIG. 2. The housing 220 around the disk-pack turbine 250 provides an enclosure in which the disk(s) 260 and rotors 264, 266 are able to rotate. The following disclosure provides an example of how these modules may be constructed and assembled.

The fluid intake module 100 includes a vortex chamber (or intake chamber) 130 within a housing 120 having fluid inlets 132 in fluid inlets in at least one embodiment are sized and angled to assist in creating a vortex in the charging medium within the vortex chamber 130. The vortex chamber 130 is illustrated as including an annular mounting collar 125 having an opening 138. The collar 125 allows the intake chamber 130 to be connected in fluid communication with the expansion chamber 252. The fluid intake module 100 sits above the disk-pack module 200 and provides the initial stage of fluid processing. In at least one embodiment, the vortex chamber 130 is stationary in the system with flow of the charging media through it driven, at least in part, by rotation of the disk-pack turbine 250 present in the housing 220. In another embodiment, a vortex is not created in the charging media but, instead, the vortex chamber 130 acts as a conduit for moving the charging media from its source to the expansion chamber 252.

The disk-pack module 200 includes at least one disk-pack turbine 250 that defines at least one expansion chamber 252 in fluid communication with the vortex chamber 130. The fluid exits from the vortex chamber 130 into the expansion chamber 252. The expansion chamber 252 as illustrated is formed by a rigid feature 2522 incorporated into a lower rotor (or lower disk) 266 in the disk-pack turbine 250 with the volumetric area defined by the center holes in the stacked disks 260 and an upper rotor 264. In at least one embodiment, there are multiple expansion chambers within the disk-pack turbine each having a lower disk 266 with the rigid feature 2522. See, e.g., FIGS. 9 and 10 and the next section of this disclosure.

As illustrated, the disk-pack turbine 250 includes an upper rotor 264, a middle disk 260, and a lower rotor 266 with each member having at least one surface having a waveform pattern 261 present on it. The illustrated at least one rotatable disk(s) 260 and rotors 264, 266 are stacked or placed adjacent to each other such that a small space of separation remains between the adjacent disk/rotor to form disk chambers 262 through which the charging media will enter from the expansion chamber 252. The disk chambers 262 are lined with waveforms 261 that are complementary between adjacent rotor/disk(s) as illustrated, for example, in FIGS. 8A-8C, 15A, and 15B. In at least one embodiment, the waveforms include no angles along any radius extending from a start of the waveform pattern to the end of the waveform pattern. In FIG. 4, the illustrated waveform patterns 261 are a series of concentric circles, but based on this disclosure it should be understood that the concentric circles can be replaced by other patterns discussed in this disclosure and depicted in the figures. The illustrated rotors 264, 266 and disk(s) 260 are spaced from each other to form disk chambers 262 between them that are in fluid communication with the expansion chamber 252. One way to space them apart is illustrated in FIGS. 3 and 4, where impellers 270 such as ceramic spacers are used to separate them and also to interconnect them together so that they rotate together. Alternative materials besides ceramics that would work include materials that do not conduct electrical current to electrically isolate the illustrated rotors and disk from each other and the system. In further embodiments one or more of the upper rotor 264, the middle disk 260, and the lower rotor 266 are electrically connected. Another way they may be separated is using support pieces fixedly attached to support bolts running between the top and lower rotors 264, 266. The illustrated lower rotor 266 includes a parabolic/concave rigid feature 2522 that forms the bottom of the expansion chamber 252. In an alternative embodiment, the rotors 264, 266 and the disk(s) 260 are attached on their peripheries.

The upper rotor 264 and the lower rotor 266 include shoulders 2642, 2662 extending from their respective non-waveform surface. The upper rotor 264 includes a raised shoulder 2642 that passes through an opening 2222 in the upper case 222 of the disk-pack module 200 to establish a fluid pathway connection with the intake chamber 130. In the illustrated embodiment, the upper rotor shoulder 2642 is ringed by a bearing 280 around it that rests on a flange 2224 of the upper case 222 and against the inside of the collar 125 of the intake chamber housing 120. The lower rotor shoulder 2662 passes through an opening 2262 in a lower case 226 to engage the drive shaft 314. The lower rotor shoulder 2662 is surrounded by a bearing 280 that rests against the flange 2264 of the lower case 226. In an alternative embodiment, the upper rotor 264 and the lower rotor 266 include a nesting hole for receiving a waveform disk where the nesting hole is defined by a periphery wall with gaps for receiving a connection member of the waveform disk. See, e.g., FIG. 15D.

In at least one embodiment, the center disk 260 will begin to resonate during use as it spins around the central vertical axis of the system and fluid is passing over its surface. As the center disk 260 resonates between the upper and lower rotors 264, 266, the disk chambers 262 will be in constant flux, creating additional and variable zones of expansion and compression in the disk chambers 262 as the middle disk resonates between the upper and lower rotors 264, 266, which in at least one embodiment results in varied exotic motion. The resulting motion in at least one embodiment is a predetermined resonance, sympathy, and/or dissonance at varying stages of progression with the frequency targeted to the frequency of the molecules/atoms of the material being processed to manipulate through harmonics/dissonance of the material.

In at least one embodiment, one or more of the disk-pack turbine components may be prepared/equipped with a capacity for the induction of specifically selected and/or differentiated electrical charges which may be static or pulsed at desirable frequencies from sources 320. Examples of how electrical charges may be delivered to specific components include electrical brushes or electromechanical isolated devices, induction, etc., capable of delivering an isolated charge to specific components such as alternately charging disks within a rotor with opposite/opposing polarities. In addition to inducing electrical charges to rotating disk-pack turbine components, electrical charging can also be a useful means of affecting a polar fluid, i.e., when it is desirable to expose a subject charging medium to opposing attractive influences or, in some cases, pre-ionization of a fluid. For example, passing in-flowing media through a charged ion chamber for pre-excitation of molecular structures prior to entry into the vortex chamber, followed by progression into the expansion and distribution chamber may enhance dissociative efficiencies.

The housing 220 includes a chamber 230 in which the disk-pack turbine 250 rotates. As illustrated in FIGS. 3 and 4, the housing chamber 230 and the outside surface of the disk-pack turbine 250 in at least one embodiment have complementary surfaces. The illustrated housing 220 includes the upper case 222, the bottom case 226, and a peripheral case 224. The illustrated housing 222 also includes a pair of flow inhibitors 223, 225 attached respectively to the upper case 222 and the bottom case 226. Based on this disclosure, it should be appreciated that some components of the housing 220 may be integrally formed together as one piece. FIG. 3 also illustrates how the housing 220 may include a paraboloid feature 234 for the chamber 230 in which the disk-pack turbine 250 rotates. The paraboloid shape of the outside surface of the disk-pack turbine 250, in at least one embodiment, assists with obtaining the harmonic frequency of the rotors 264, 266 and disk(s) 260 themselves as they spin in the chamber 230, thus increasing the dissociation process for the fluid passing through the system. In at least one embodiment, the rotors 264, 266 have complementary outer faces to the shape of the chamber 230.

The upper case 222 includes an opening 2222 passing through its top that is aligned with the opening in the bearing 280. As illustrated in FIGS. 3 and 4, a bearing 280 is present to minimize any friction that might exist between the shoulder 2642 of the top rotor 264 and the housing collar 125 and the upper case 222. The bearing 280, in at least one embodiment, also helps to align the top 2524 of the expansion chamber 252 with the outlet 138 of the vortex chamber 130. Likewise, the lower case 226 includes an opening 2262 passing through its bottom that is lined with a bearing 280 that surrounds the shoulder (or motor hub) 2662 of the lower disk 266.

The peripheral case 224 includes a plurality of discharge ports 232 spaced about its perimeter. The discharge ports 232 are in fluid communication with the disk chambers 262. The flow inhibitors 223, 225 in the illustrated system, in at least one embodiment, assist with routing the flow of fluid exiting from the periphery of the disk-pack turbine 250 towards the discharge ports (or collection points) 232 in the housing 220. In at least one embodiment, there is a containment vessel 900 (see, e.g., FIGS. 6 and 7) around the housing 220 to collect the discharged gas from the system.

Additional examples of electrical isolation components include the following approaches. The drive system/spindle/shaft is electrically isolated via the use of a large isolation ring made of non-conductive material, which creates discontinuity between the drive shaft and ground. In at least one embodiment, all disk-pack turbine components are electrically isolated from one another utilizing, for example, non-conducting tubes, shims, bushings, isolation rings, and washers. The main feed tube (or intake chamber) is also electrically isolated from the top rotor via the use of an additional isolation ring. The feed tube and support structure around the system are electrically isolated via the use of additional isolation elements such as nylon bolts. In most cases, there is no electrical continuity between any components, from drive shaft progressing upward through all rotating components to the top of the vortex chamber and support structures. There are, however, occasions when electrical continuity is desirable as described previously.

In at least one embodiment, the vortex chamber 130 shapes the inflowing charging media into a through-flowing vortex that serves to accumulate, accelerate, stimulate, and concentrate the charging media as it is drawn into the expansion chamber 252 by centrifugal suction. As the rotating compressed charging media passes through the base opening 138 of the vortex chamber 130, it rapidly expands as it enters into the revolving expansion chamber 252. Once within the expansion chamber 252, the charging media is further accelerated and expanded while being divided and drawn by means of a rotary vacuum into the waveform disk channels 262 of the rotors 264, 266 and disk(s) 260 around the expansion chamber 252. While progressing through the waveform geometries of the rotors and disks around the expansion chamber 252, the charging media is exposed to a multiplicity of dynamic action and reactionary forces and influences which work in concert to achieve desired outcomes relative to conditioning, separation, and/or transformation of liquids and gases and/or other matter.

Figure 5:
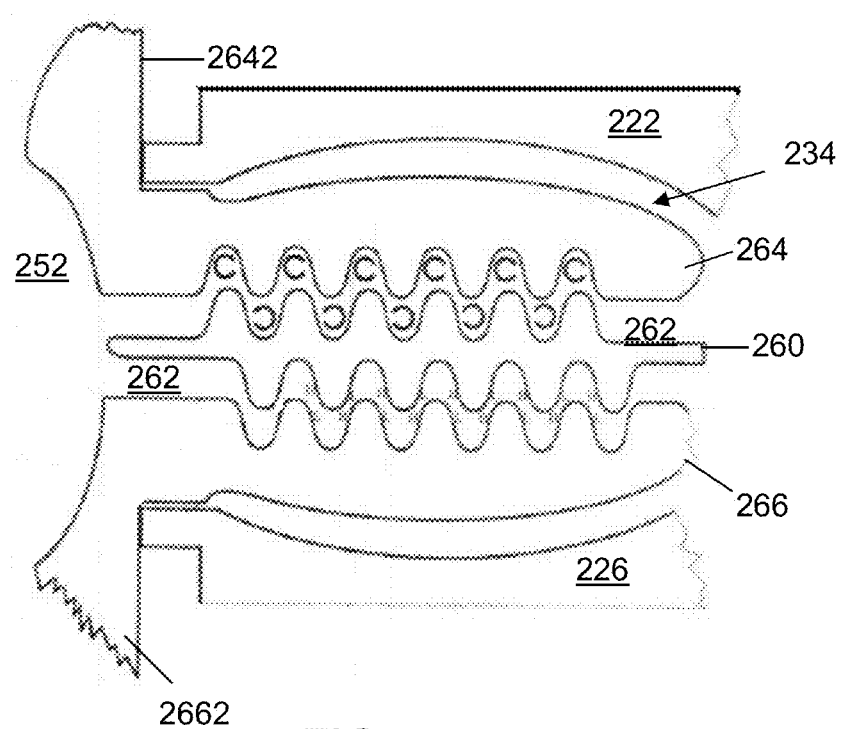
FIG. 5 illustrates a partial cross-sectional view of the system illustrated in FIG. 2.

FIG. 5 illustrates a partial cutaway view of the embodiment illustrated in FIGS. 2-4. FIG. 5 provides an example of the fluid flow dynamics within the disks in accordance with the present invention. Waveforms channels are formed in the disk chambers 262 by the geometric patterns 261 on the rotors 264, 266 and disk(s) 260. FIG. 5 illustrates how stepped waveform harmonics cause high and low pressure zones to form in the channels with the circulation of the flow illustrated from the top to the bottom of the zones by the C's (clockwise) and backward C's (counterclockwise) that reflect the circulation. These pressure zones and tortile reciprocating motion allow the charging media and material to flow within the channels and to break the bonds between atoms in at least one embodiment. As the disk-pack turbine 250 rotates the charging media within the expansion chamber 252, the charging media flows from the center of the disk-pack turbine 250 through the disk chambers 262 towards the periphery of the disk-pack turbine 250. As the charging media passes through the disk chambers 262 the media is conditioned, separated, dissociated, and/or transformed based on controllable variables such as construction materials, waveform geometry, tolerances, numbers of progressions, waveform diameters, disk stack densities, internal and external influences and charging media composition.

Figure 6A:
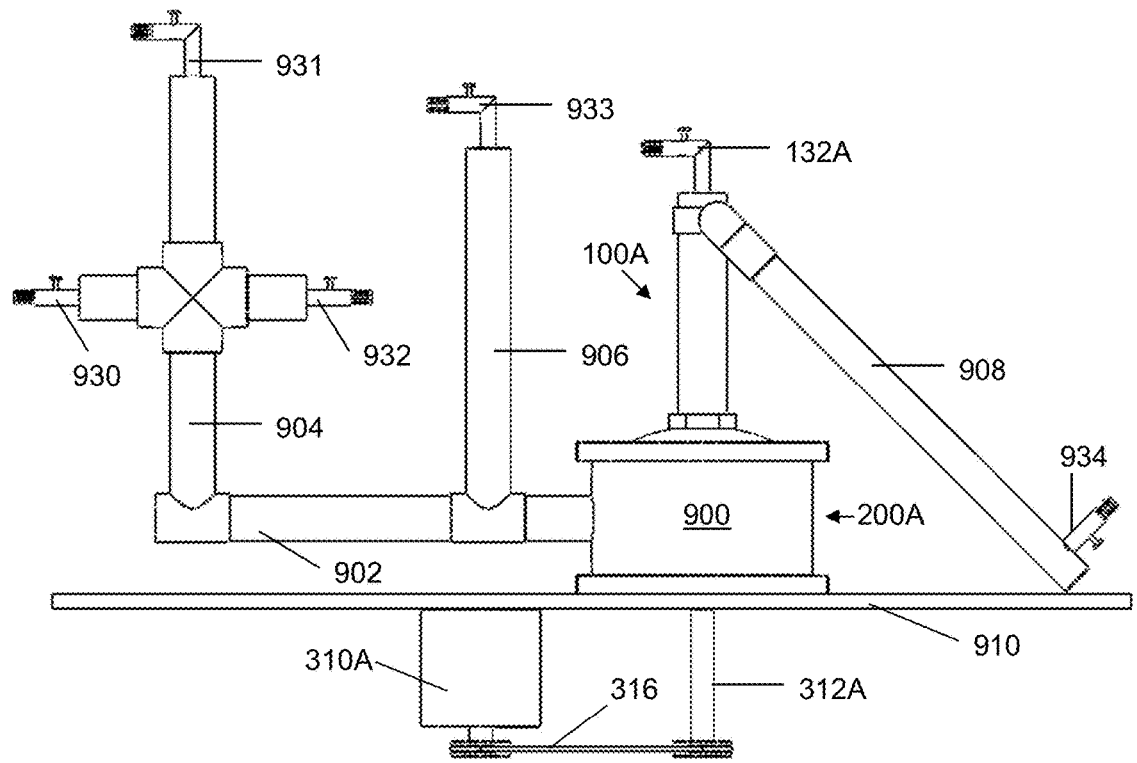
FIGS. 6A and 6B illustrate side and perspective views of another embodiment according to the invention.
Figure 6B:
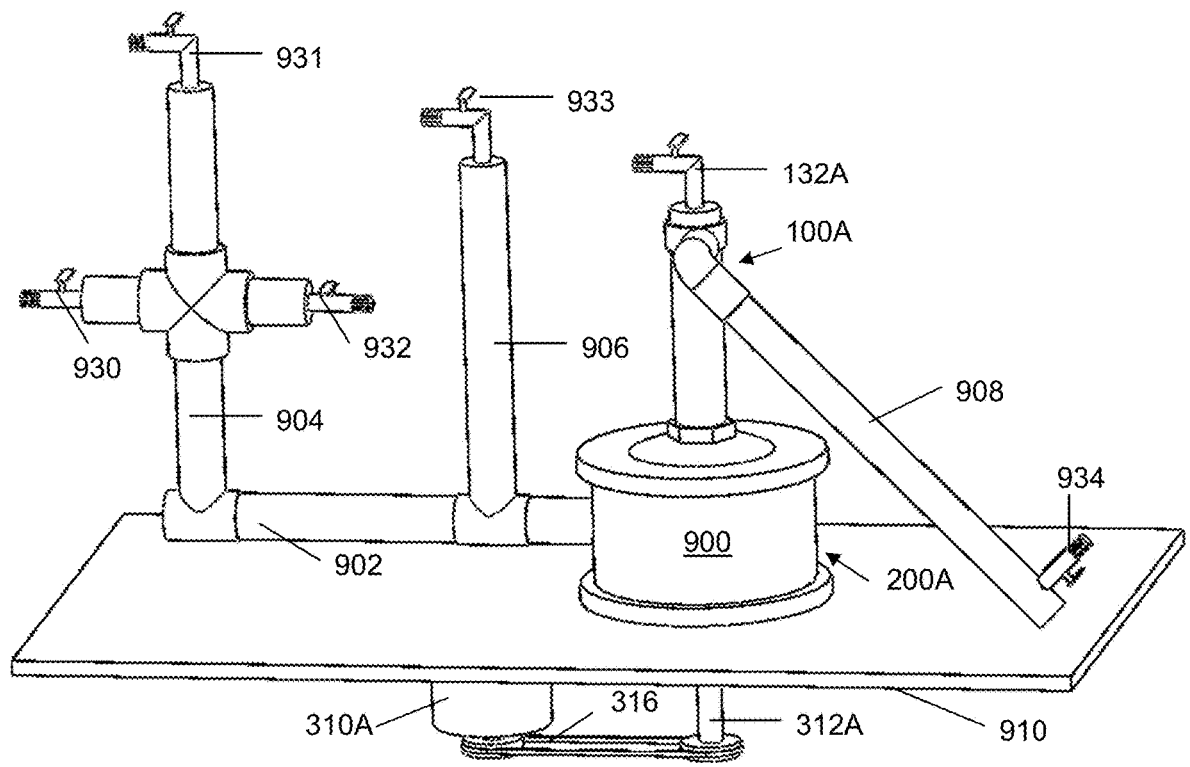

FIGS. 6A and 6B illustrate an embodiment having a plurality of gas collection conduits 902, 904, 906, 908 for further separating gases based on weight. The illustrated system includes a containment vessel 900 that encloses the disk-pack module 200A. Also illustrated is an example of motor 310A driving the driveshaft 312A with a belt 316A and a work surface (or bench/platform) 910. The illustrated embodiment shares some similarities with the previous embodiment including the presence of an intake module 100A with an intake 132A and a disk-pack module 200A.

The illustrated system includes at least five points for removal of gas and other material from the system. Extending out from the containment vessel 900 is a separation conduit 902 that branches twice into a first branch conduit 904 and a second branch conduit 906. The first branch conduit 904 provides three points at which fluid may be withdrawn from the system through valves 930, 931, 932. The second branch conduit 906 leads to valve 933. Extending from the intake module 100A is a third branch conduit 908 that leads to valve 934. Based on this disclosure, it should be appreciated that the separation conduits can take a variety of forms other than those that are illustrated in FIGS. 6A and 6B. The gases (or fluids) are separated in at least one embodiment using at least one of the following: specific gravity, exit velocity, opposite-attractors installed along the conduit or proximate to a valve, electric and/or magnetic for matter with positive/negative or North/South polar predominance. In at least one embodiment the waveform disks illustrated in FIGS. 7A and 7B were used in a gas separation designed system. In at least one embodiment, it was found that when the waveform disks illustrated in FIGS. 7A and 7B were rotated between 3,680 and 11,000 RPM that hydrogen was separated out from environmental air.

Figure 7A:
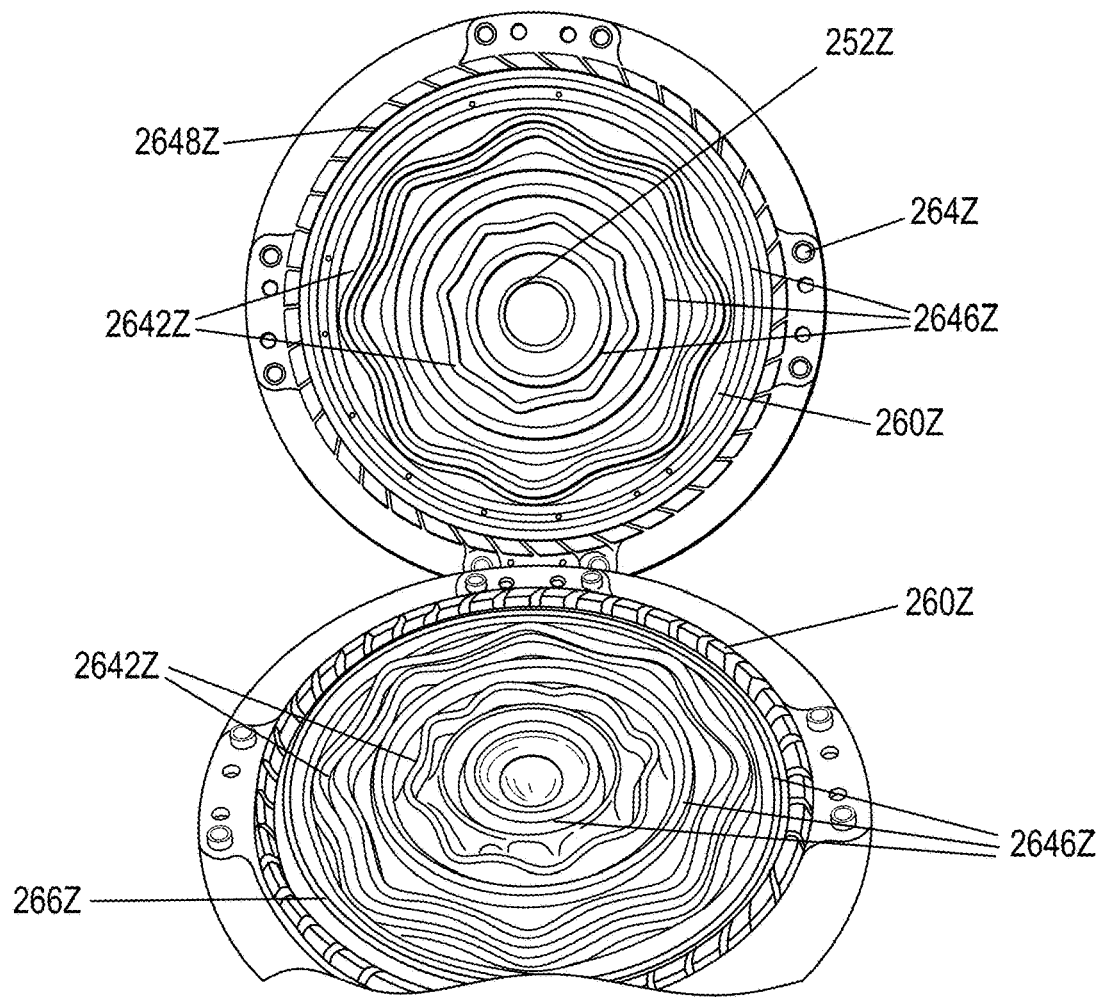
FIGS. 7A and 7B illustrate an example disk-pack turbine according to the invention.
Figure 7B:
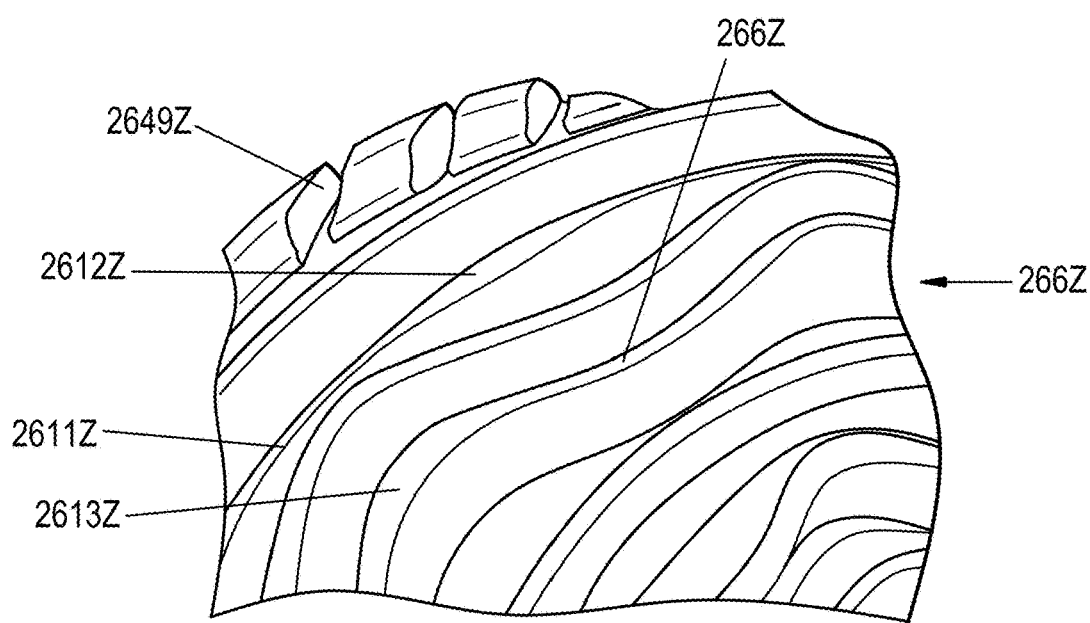

FIG. 7A illustrates a pair of disks 260Z installed in a top rotor 264Z and a bottom rotor 266Z, respectively, that have been found to be beneficial for a gas separation embodiment. The illustrated disks 260Z include matched waveform patterns with two sets of hyperbolic waveforms 2642Z and three sets of substantially circular waveforms 2646Z. FIGS. 7A and 7B illustrate an alternative embodiment that includes exit ports including multiple convergent exit ports 2649Z and multiple divergent exit ports 2648Z that pair together to form convergent/divergent ports. FIG. 7B illustrates an example of a waveform changing height as it travels around the disk (2611Z represents the low level and 2612Z represents the high level). FIG. 7B illustrates an example of how the waveforms may vary in width (2613Z represents a wide segment and 2614Z represents a thinner segment). FIGS. 7A and 7B illustrate an example of how waveforms 2642Z and 2646Z travel substantially around and substantially axially centered about the opening 252Z in top rotor 264Z.

For various applications, it may be desirable to have an internal geometry conducive to hyper-expansion of the charging media followed by reduction/diminishing flow tolerances for the purpose of compression or reconstitution of the charging media. This secondary compression cycle is useful for producing concentrated, highly energetic, molecularly reorganized charging media for applications such as fuel formulation.

Figure 8A:
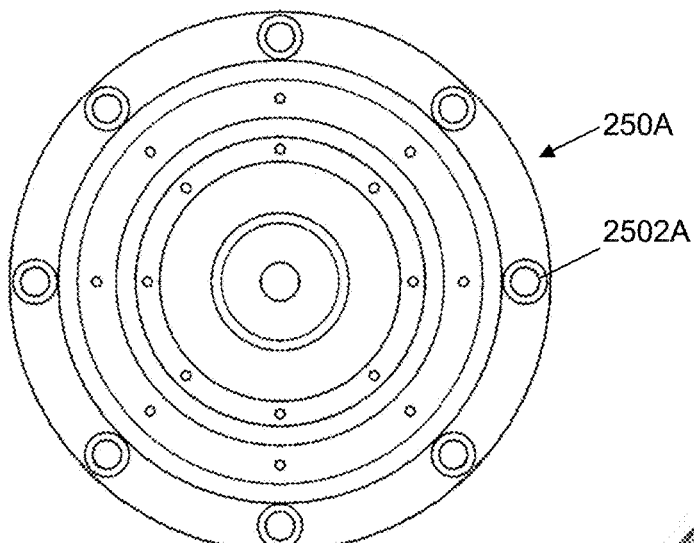
FIGS. 8A-8C illustrate another example disk-pack turbine according to the invention.
Figure 8B:
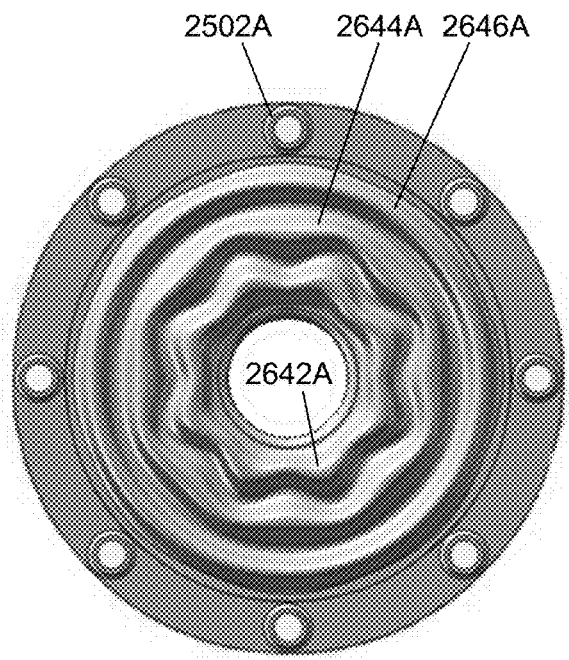
Figure 8C:
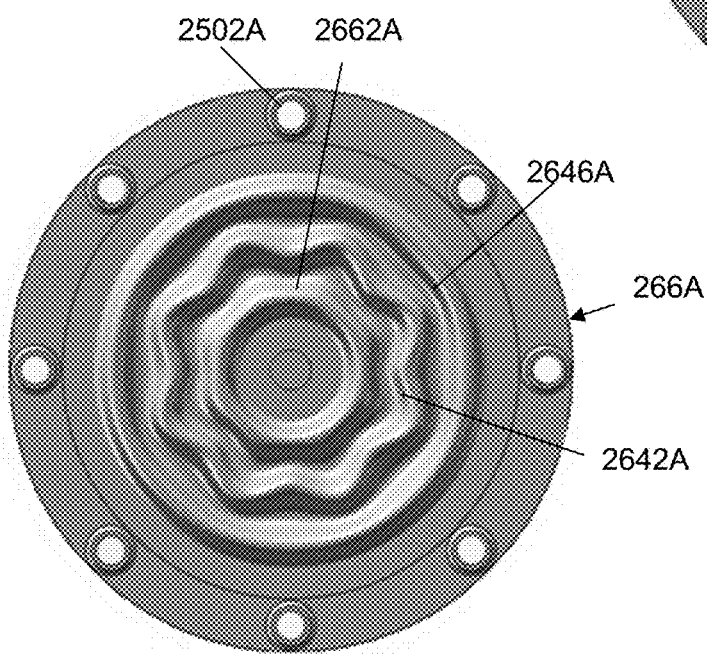

One cool, moist morning prior to starting a testing session with a system built according to the invention similar to the fluid intake module 100A and the disk-pack module 200A illustrated in FIG. 6A, a system valve 132A in fluid communication with the containment vessel (or housing) 900 was pulled open. This resulted in a relatively loud thump/energetic reaction/phoom. On the next day, another individual was asked to pull the valve 132A open for verification. The reactionary phoom occurred again. It was understood that the moisture content in the air, itself, was being dissociated, with the lighter material being contained in the upper, domed part of the sealed vessel and trapped therein by a cushion of air. For verification, all valves were closed and the system was allowed to run at 2700 RPM in this closed condition for 5 minutes. A valve 132A was slowly pulled open and a flame applied to the discharging material, which resulted in the valve erupting in a momentary pale blue flame. Further testing and refinement of the process included the introduction of higher moisture/water concentrations in the form of atomized mist and water injection. Simple vessel valve and tubing arrangements were set up for rudimentary gas product division and capture as illustrated in FIGS. 6A and 6B. Utilizing a small biaxial configuration for the disk-pack turbine, which included just an upper rotor 264A and a lower rotor 266A, was sufficient to establish repeatable, verifiable dissociation achieved through hyperbolic rotary motion alone. An example of the rotors 264A, 266A of the disk-pack turbine 250A is illustrated in FIGS. 8A-8C. FIG. 8A illustrates the top of the disk-pack turbine 250A, FIG. 8B illustrates the bottom face of the upper rotor 264A, and FIG. 8C illustrates the top face of the lower rotor 266A. The illustrated waveform pattern includes a sinusoidal ridge 2642A and a circular ridge 2646A. The lower rotor 266A includes a circular outer face ridge 2646A. Also, illustrated is an example of mounting holes 2502A for assembling the disk-pack turbine 250A. In an alternative embodiment, the wave patterns are switched between the upper rotor 264A and the bottom rotor 266A. Stoichiometric gas concentrations capable of sustaining flame were achieved through broad variations in systemic configuration and operating conditions.

c. MULTI-STAGE SYSTEMS

FIGS. 9A-11 illustrate different embodiments of a multiple stage system that includes disk-pack turbines 250B-250D for each stage of the system. The illustrated disk-pack turbines are different, because the waveform disks are conical shape with circular waveform patterns. FIGS. 9A and 9B illustrate a common housing 220B, intake module 130B, and discharge port 232B. Each disk-pack turbine includes at least one expansion chamber 252B-252D that routes fluid into the at least one disk chamber 262 of the disk-pack turbine 250B-250D. In the illustrated examples, each disk-pack turbine 250B-250D includes a top rotor 264B-264D that substantially provides a barrier to fluid exiting the periphery from flowing upwards above the disk-pack turbine to assist in routing the exiting fluid to the next stage or the at least one discharge port. In a further embodiment, the at least one discharge port is located along the periphery of the last disk-pack turbine instead of or in addition to the illustrated bottom discharge port 232B in FIGS. 10 and 11. These figures illustrate the disk-pack module housing 220B with only a representative input illustrated to represent the vortex chamber (or alternatively an intake chamber that is substantially cylindrical) that feeds these illustrated systems.

When the discharge port is at the bottom of the housing, the driveshaft (not illustrated) passes up through the discharge port to engage the lowest rotor. Between the individual disk-pack turbines there are driveshafts such as those illustrated in FIG. 9C that extend through the top rotating rotor/disk of the lower disk-pack turbine to the bottom rotor of the higher disk-pack turbine or alternatively there are a plurality of impellers between each pair of disks that are not mounted to the housing. The driveshafts 312B will connect to the rotating disk via support members to allow for the flow of fluid through the expansion chamber. FIG. 9C illustrates a partial cross-section of a multi-stage system with a disk-pack turbine 250D' and a second disk-pack turbine 250B' that are similar to the disk-pack turbines discussed in connection with FIGS. 10 and 11 except there is no flange depicted on the top rotor and the bottom of the expansion chambers is provided by a concave feature 3122B and 3124B incorporated into the driveshaft 312B. Below each disk-pack turbine is a discharge module that includes discharge ports 232' in a top surface to funnel the captured gas through discharge outlet 2322' into the next stage or the discharge port of the system.

FIG. 10 illustrates a cross-sectional and conceptual view of an example of a multi-stage stacked waveform disk system in accordance with an embodiment of the present invention. The illustrated multi-stage system includes a plurality of stacked disk-pack turbines 250B-250D that are designed to first expand/dissociate and then compress/concentrate the charging media through the expansion chamber and the disk chambers in each disk-pack turbine. In an alternative embodiment, additional ports are added around the periphery at one or more of the stages to allow material (or fluid) to be added or material to be recovered/removed from the system.

Disk-pack turbine 250D is an expansive waveform disk-pack turbine and includes multiple waveform channels. Disk-pack turbine 250C is a second stage concentrating/compressive waveform disk-pack turbine. Disk-pack turbine 250B is a third stage concentrating/compressive waveform disk-pack turbine that provides an example of just a pair of rotors. The illustrated system includes an intake chamber 130B in fluid communication with the expansion chamber 252B. The expansion chamber 252B is formed by openings in the center of the plurality of rotors 264B, 266B and disks 260B that form disk-pack turbine 250B. The bottom rotors 266B-266D in disk-pack turbines 250B-250D, respectively, are solid and do not have an opening in the center, but instead include a bottom concave feature 2522B, 2522C, 2522D that forms the bottom of the expansion chamber 252B. The solid bottom rotors 266B-266D prevent fluid from flowing completely through the center of the disk-pack turbine 250B-250D and encourage the fluid to be distributed into the various disk chambers 262 within the disk-pack turbines 250B-250D such that the fluid flows from the center to the periphery. Each of the top rotors 264B-264D in disk-pack turbines 250B-250D includes lips 2646 that substantially seal the perimeter of the top disk with a housing 220. The lips 2646 thereby encourage fluid to flow within discharge channels 253B-253D. Discharge channel 253B connects disk-pack turbine 250B and the expansion chamber of disk-pack turbine 250C in fluid communication. Discharge channel 253C connects disk-pack turbine 250C and the expansion chamber 252B of disk-pack turbine 250B in fluid communication. Discharge channel 253D connects disk-pack turbine 250D in fluid communication with fluid outlet 232B. In an alternative embodiment, the top rotors do not rotate and are attached to the housing to form the seals.

FIG. 11 illustrates a cross-sectional view of another example of a multi-stage stacked waveform disk system in accordance with an embodiment of the present invention. The multi-stage system of this embodiment includes a plurality of disk-pack turbines. The illustrated disk-pack turbines 250D, 250C, 250B are taken from the previous embodiment illustrated in FIG. 10 and have been reordered to provide a further example of the flexibility provided by at least one embodiment of the invention.

The charging media may also be externally pre-conditioned or "pre-sweetened" prior to entering the system. The pre-conditioning of the charging media may be accomplished by including or mixing into the charging media desirable material that can be molecularly blended or compounded with the predominant charging media. This material may be introduced as the media enters into and progresses through the system, or at any stage within the process. Polar electrical charging or excitation of the media may also be desirable. Electrical charging of the media may be accomplished by pre-ionizing the media prior to entering the system, or by exposing the media to induced frequency specific pulsed polar electrical charges as the media flows through the system via passage over the surface of the disks.

d. POWER GENERATION

These objectives are accomplished, for example, via the harnessing and utilization of transformational dynamics and forces propagated as the result of liquids, gases, and/or other forms of matter and energy progressing through and/or interacting with rotating hyperbolic waveform structure.

In at least one embodiment the present invention provides a system and method for producing and harnessing energy from ambient sources at rates that are over unity, i.e., the electrical energy produced is higher than the electrical energy consumed (or electrical energy out is greater than electrical energy in). The system and method in at least one embodiment of the present invention utilize rotating waveforms to manipulate, condition, and transform mass and matter into highly energetic fields, e.g., polar flux, electrical, and electro-magnetic fields. The present invention, in at least one embodiment, is also capable of generating diamagnetic fields as strong forces at ambient operational temperatures.

Figure 15A:
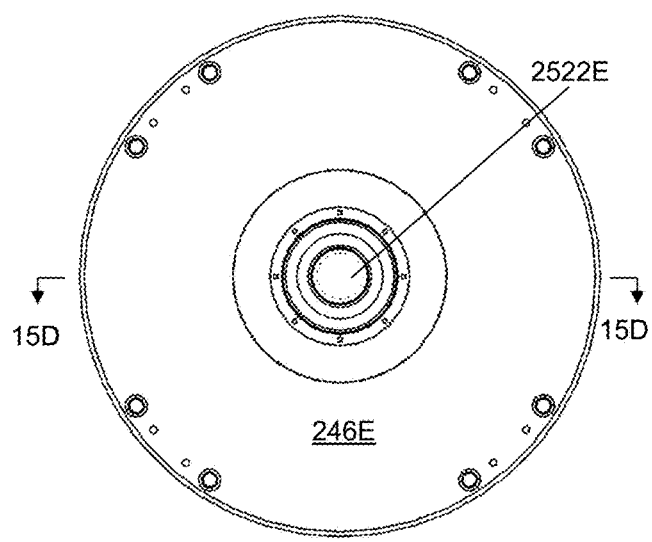
Figure 15B:
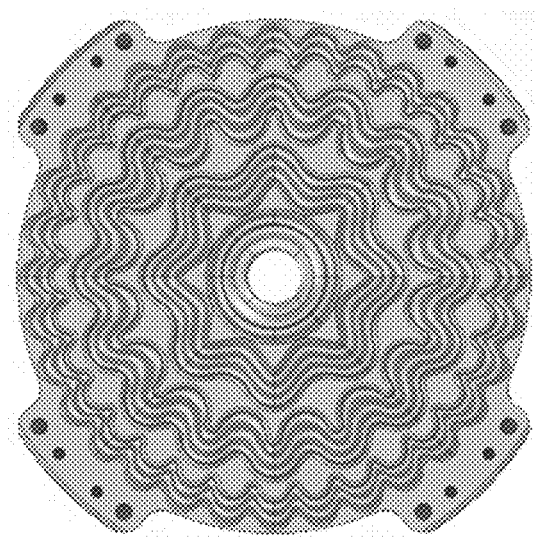
Figure 15C:
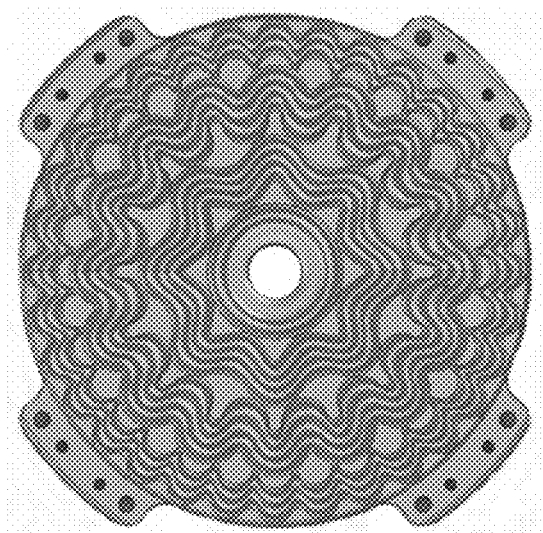
Figure 15D:
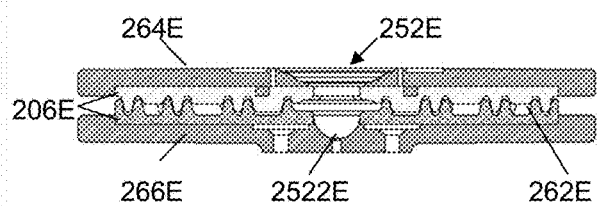

FIGS. 12-15D illustrate an example embodiment of the present invention that is useful in generating electrical energy. The illustrated system uses as inputs environmental energies, air and electrical energy to drive a motor to rotate the disk-pack turbine and, in a further embodiment, it harnesses the environment around the system to form magnetic fields. The present invention in at least one embodiment is capable of producing very strong field energy at ambient temperatures while using relatively minimal input electrical energy compared to the electrical energy production. FIGS. 15A-15D illustrate a pair of waveform disks that can be mated together with a pair of rotors. The illustrated waveform disks are depicted in FIG. 14. FIG. 15A illustrates the top of a disk-pack turbine 250E with a top rotor 264E with an opening into the expansion chamber 252E. FIGS. 15B and 15C illustrate a pair of mated disks for use in power generation according to the invention. The disks are considered to be mated because they fit together as depicted in FIG. 15D, because a disk channel 262E is formed between them while allowing fluid to pass between the disks 260E. FIG. 15D illustrates an example of the mated disks 260E placed between a top rotor 264E and a bottom rotor 266E with bolts attaching the components together around the periphery. As mentioned earlier, the bolts in at least one embodiment pass through a nylon (or similar material) tube and the spacers are nylon rings.

The creation of a magnetic field to generate electrical current results from the rotation of a disk-pack turbine 250E and at least one magnet disk 502 that is on an opposite side of the coil disk from the disk-pack turbine. In at least one embodiment, the coil disk 510 includes a plurality of coils 512 that are connected into multiple-phase sets. The disclosure that follows provides additional discussion of the embodiment illustrated in FIGS. 12-15D; as an example, starting with the chamber 130E and proceeding down through the system. As with the previous embodiments, the chamber 130E feeds the charging media to the disk-pack turbine 250E during operation of the system and in at least one further embodiment the chamber 130E is omitted as depicted in FIGS. 16 and 17. In the embodiments depicted in FIGS. 16 and 17, the intake occurs through the feed housing 126E and/or the periphery of the disk-pack turbine 250E. As mentioned previously, the intake of air is not a requirement for operation of the system in at least one embodiment and as such the feed housing 126E may be replaced by a shaft.

In at least one embodiment, the intake chamber 100E includes a cap 122E, a housing 120E connected to an intake port 132E, a lower housing 124E around a bearing 280E as illustrated, for example, in FIG. 14. In an alternative embodiment, one or more of the intake chamber components are integrally formed together. The housing 120E includes a vortex chamber 130E that includes a funnel section that tapers the wall inward from the intake ports 132E to an opening that is axially aligned with the feed chamber 136E. The funnel section in at least one embodiment is formed by a wall that has sides that follow a long radial path in the vertical descending direction from a top to the feed chamber 136E (or other receiving section or expansion chamber). The funnel section assists in the formation of a vortex flow of charging medium downward into the system.

Below the main part of the chamber 130E is a tri-arm centering member 602 that holds in place the system in axial alignment with the drive shaft 314E. The vortex chamber 130E is in fluid communication with feed chamber 136E present in feed housing 126E. The feed housing 126E passes through a collar housing 125E and a magnet plate 502, which is positioned and in rotational engagement with the collar housing 125E. The feed housing 126E is in rotational engagement through bearings 282E with the collar housing 125E. The collar housing 125E is supported by bearing 282E that rides on the top of the lower feed housing that is connected to the disk-pack turbine 250E. The feed chamber 136E opens up into a bell-shaped section 138E starting the expansion back out of the flow of the charging medium for receipt by the expansion chamber 252E. The intake housing components 120E, 122E, 124E together with the feed housing 138E in at least one embodiment together are the intake module 100E.

The magnet plate 502 includes a first array of six magnets (not shown) attached to or embedded in it that in the illustrated embodiment are held in place by bolts 5022 as illustrated, for example, in FIG. 14. In another embodiment, the number of magnets is determined based on the number of phases and the number of coils such that the magnets of the same polarity pass over each of coils in each phase-set geometrically at the exact moment of passage. The magnet plate 502 in at least one embodiment is electrically isolated from the feed housing 126E and the rest of system via, for example, electrically insulated/non-conducting bearings (not shown). The upper plate 502 is able to freely rotate about the center axis of the disk-pack turbine 250E by way of the collar housing 125E made from, for example, aluminum which is bolted to the top of the upper round plate 502 and has two centrally located ball bearing assemblies, an upper bearing 282E and a lower bearing 283E, that slide over the central feed housing 126E, which serves as a support shaft. The distance of separation between the magnet plate 502 and the top of the disk-pack turbine 250E is maintained, for example, by a mechanical set collar, shims, or spacers.

During operation, the first array of magnets is in magnetic and/or flux communication with a plurality of coils 512 present on or in a stationary non-conductive disk (or platform) 510. The coil platform 510 is supported by support members 604 attached to the frame 600 in a position between the array of magnets and the disk-pack turbine 250E. The platform 510 in the illustrated embodiment is electrically isolated from the rest of the system. In at least one embodiment, the platform 510 is manufactured from Plexiglas, plastic, phenolic or a similarly electrically inert material or carbon fiber.

A disk-pack turbine 250E is in rotational engagement with the feed chamber 138E. As with the other embodiments, the disk-pack turbine 250E includes an expansion chamber 252E that is in fluid communication with the intake chamber 130E to establish a fluid pathway from the inlets to the at least one disk chamber 262E (two are illustrated in FIG. 14) in the disk-pack turbine 250E. The illustrated embodiment includes two pairs of mated disks 260E sandwiched by a pair of rotors 264E, 266E where the disks 260E and the top rotor 264E each includes an opening passing therethrough and the bottom rotor 266E includes a rigid feature 2522E that together define the expansion chamber 252E. The disk chambers 262 in the illustrated embodiment are present between the two disks in each mated pair with slightly paraboloid shaped surfaces (although they could be tapered or flat) being present between the neighboring disks, where the bottom disk of the top mated disk pair and the top disk of the bottom mated disk pair are the neighboring disks. Each disk 260E of the mated pairs of disks is formed of complimentary non-magnetic materials by classification, such that the mated pair incorporating internal hyperbolic relational waveform geometries creates a disk that causes lines of magnetic flux to be looped into a field of powerful diamagnetic tori and repelled by the disk. An example of material to place between the mated disk pairs is phenolic cut into a ring shape to match the shape of the disks.

In the illustrated embodiment, the bottom rotor 266E provides the interface 2662E with the drive system 314E. In at least one embodiment, the rotors will be directly connected to the respective disks without electrically isolating the rotor from the nested disk. In another embodiment, the disks are electrically isolated from the rotor nesting the disk. The illustrated configuration provides for flexibility in changing disks 260E into and out of the disk-pack turbine 250E and/or rearranging the disks 260E.

A lower coil platform 510' may also be attached to the frame 600 with a plurality of support members 604. The lower platform 510' includes a second array of coils 512' adjacent and below the disk-pack turbine 250E. An optional second array of six magnets (not shown) present in magnet plate 504 are illustrated as being in rotational engagement of a drive shaft 314E that drives the rotation of the disk-pack turbine 250E, but the bottom magnet plate 504 in at least one embodiment is in free rotation about the drive shaft 314E using, for example, a bearing. The drive shaft 314E is driven by a motor, for example, either directly or via a mechanical or magnetic coupling.

Each of the first array of coils 512 and the second array of coils 512' are interconnected to form a phased array such as a three or four phase arrangement with 9 and 12 coils, respectively. Each coil set includes a junction box 5122 (illustrated in FIG. 12) that provides a neutral/common to all of the coils present on the coil disk 510 and provision for Earth/ground. Although not illustrated, it should be understood based on this disclosure that there are a variety of ways to interconnect the coils to form multiple phases in wye or delta or even a single phase by connecting coils in series or parallel. As illustrated, for each coil, there are a pair of junction points that are used to connect to common and positive and as illustrated the left box 5124 attaches to electrical power out while the right box 5126 connects to neutral/common.

In at least one embodiment with a three phase arrangement, the coils for each phase are separated by 120 degrees with the magnets in the magnet plate spaced every 60 degrees around the magnet plate. The first array of magnets, the first array of coils 512, the second array of coils 512', and second array of magnets should each be arranged in a pattern substantially within the vertical circumference of the disk-pack turbine 250E, e.g., in circular patterns or staggered circular patterns of a substantially similar diameter as the disks 260E. In another embodiment, there are multiple coil platforms and/or coil arrays between the disk-pack turbine and the magnet plate.

The lower magnet plate 504 has a central hub 5042 bolted to it which also houses two ball bearing assemblies 282E, which are slid over the main spindle drive shaft 314E before the disk-pack turbine 250E is attached. This allows the lower magnet plate 504 to freely rotate about the center axis of the system and the distance of separation between the lower plate 504E and disk-pack turbine 250E is maintained, for example, by a mechanical set collar, spacers, and/or shims or the height of the driveshaft 314E.

Suitable magnets for use in at least one embodiment of the invention are rare earth and/or electromagnets. An example is using three inch disk type rare earth magnets rated at 140 pounds and in further embodiments magnets rated at 400 pounds are used; but based on this disclosure it should be understood that a variety of magnet strengths may be used. Depending on the construction used, all may be North magnets, South magnets, or a combination such as alternating magnets. In at least one embodiment, all metallic system components, e.g., frame 600, chamber housing 120E, magnet plates 502, 504, are formed of non-magnetic or very low magnetic material with other system components, e.g., bearings, spacers, tubing, etc., are made of non-magnetic materials. The system, including frame 600 and lower platform 504, in at least one embodiment are electrically grounded (Earth). In a further embodiment, all movable components, particularly including chamber housing 120E and individual components of the disk-pack turbine 250E, are all electrically isolated by insulators such as non-conductive ceramic or phenolic bearings, and/or spacers.

In a further embodiment, the magnet plate(s) is mechanically coupled to the waveform disks. In a still further embodiment, the magnet plate(s) is mechanically locked to rotate in a fixed relationship with the disk-pack turbine through for example the collar housing 125E illustrated in FIG. 13. This results in lower, but very stable and safe output values. In a further alternative embodiment, the magnet plate(s) are connected to a separate drive system(s) that provides independent control of rotation speed from the rotation speed of the disk-pack turbine and in at least one further embodiment precise frequency control which can range from hertz to gigahertz as waveform structures and numbers of waveforms, other structures and waveform transitional waveform geometry have a direct correlation to outgoing output and operational frequencies. In a further embodiment, one set of coil platform and magnet plate are omitted from the illustrated embodiments of FIG. 12-17.

In use of the illustrated embodiment of FIGS. 12-14, the rotatable disk-pack turbine is driven by an external power source such as a battery bank, wall power, or a generator. In at least one embodiment, as the disk-pack turbine rotates a vacuum or suction is created in the system according to at least one embodiment. This vacuum draws a charging media into the intake chamber 130E via fluid inlets 132E. The intake chamber 130E transforms the drawn charging media into a vortex that further facilitates passing the charging media into the expansion chamber. As the charging media passes through the system, at least a portion of the through-flowing charging media is transformed into polar fluxes which are discharged or emanated from specific exit points within the system. This magnetic polar energy discharges at the center axis and periphery of the rotatable disk-pack turbine. For example, when the magnetic polar energy discharged at the periphery is a North polar flow, the magnetic energy discharged at the axis is a South polar flow. In this example, by introducing north-facing permanent magnets on magnet plates 502, 504 into the north-flowing flux, repulsive forces are realized. By placing the North-facing polar arrays at specific oblique angles, the rotatable disk-pack turbine is driven by the repelling polar flux. Utilizing only the polar drive force and ambient environmental energies and air as the charging media, the system is capable of being driven at a maximum allowed speed. Simultaneously, while generating polar flux discharges at the axis and periphery of the disk-pack turbine 250E, powerful, high torque, levitative diamagnetic fields manifest through the top and bottom surfaces of the disk-pack turbine. In at least one embodiment, the field strength of the diamagnetic fields is directly proportionate to the speed of rotation of the magnet arrays and magnet strength in relation to the rotating disk-pack turbine. Each of the mated pairs of rotatable waveform disks 260E is capable of producing very strong field energy at ambient temperatures while utilizing an extraordinarily small amount of input electrical energy. As an example, each of the mated pairs of rotatable waveform disks 260E is capable of producing well over one thousand (1,000) pounds of resistive, repulsive, levitative field energy. That is, the system is capable of repeatedly, sustainably and controllably producing a profoundly powerful diamagnetic field at ambient temperatures while utilizing relatively minimal input energy.

It is believe that the presence of the diamagnetic fields being produced by the rotating waveforms lowers the resistance in the coils to explain the lack of significant temperature change that occurs during operation of the system. This belief is supported by the lowering of the resistance present in the coils after removal from the system when measured by an ohm meter. Furthermore, the failure of the produced fields to respect polarity is further support for this belief. The generation of fields is done at substantially ambient temperatures. Additionally, overtime the coils assist in generating higher current levels as their resistance disappears.

In a further embodiment illustrated, for example, in FIG. 16, the chamber 120E above the tri-arm support member 602 is omitted and the expansion chamber pulls charging material from the atmosphere as opposed to through the intake chamber 120. In at least one embodiment, material is pulled from and discharged at the periphery of the disk-pack turbine 250E simultaneously.

FIG. 17 illustrates an alternative embodiment to that illustrated in FIG. 16. The illustrated embodiment includes a flux return 700 to restrain the magnetic fields and concentrate the magnetic flux created by the disk-pack turbine 250E and increase the flux density on the magnet plate 502 and coils 512. An example of material that can be used for the flux return 700 is steel. In at least one embodiment, the flux shield 600 is sized to match the outer diameter of the outer edge of the magnets on the magnet plate 502.

Another example embodiment of the present invention is illustrated in FIG. 18 and includes two disk-pack turbines 250F having a pair of rotors 264F, 266F sandwiching a pair of disks 260F, two sets of electrical coil arrays configured for the production of three-phase electrical power, and two bearing-mounted, free-floating, all North-facing magnetic arrays, along with various additional circuits, controls and devices. One difference with the previous embodiments is that the disk-pack turbines 250F are spaced apart leaving an open area between them into which one or more coil disks and/or magnets disks may be inserted. An example would be two coil disks sandwiching one magnet disk.

Another difference for the power-generation embodiments from the other described embodiments is the omission of a housing around all of the rotating components. One reason for this difference is that the illustrated embodiment is directed at power generation, but based on this disclosure it should be understood that an alternative embodiment adds a collection/containment dome (or wall) to this illustrated system to provide a means of collecting and harnessing for application/utilization the profound additional environmental electrical fields/DC voltages and dramatic currents/field amperage as well as the collection of any fluid components that manifest as a result of the power generation processes.

The nature of electricity generated by this embodiment is substantially different as compared to conventional power generation. The waveform disks are manufactured as nesting pairs. Each waveform disk pair may be of like or dissimilar materials, depending on design criteria, i.e., aluminum and aluminum, or, as example, aluminum, brass or copper. In at least one embodiment, the plurality of disks are formed of at least one material capable of generating strong force diamagnetism. When a waveform disk pair is separated by a specific small distance/gap and are electrically isolated from one another by means of no mechanical contact and non-conducting isolation and assembly methods and elements like those described earlier, chambers are formed between each disk pair that provide for highly exotic flow paths, motion, screening currents, frequencies, pressure differentials, and many other actionary and reactionary fluid and energetic dynamics and novel electrical and polar phenomena. Immediately upon energizing the drive motor to set the disk-pack turbine rotor in motion, the inner disk hyperbolic geometries begin to interact with the magnetic fields provided by the rotatable Rare Earth magnet arrays, even though there are no magnetic materials incorporated into the manufacture of the disk-pack turbine. By the time the disk-pack turbine reaches the speed of approximately 60 RPM, diamagnetic field effects between the disk-pack turbine faces and magnet arrays are sufficient to establish a driving/impelling link between the disk-pack turbine and magnet array faces.

A variety of magnetic polar fluxes and electrical currents begin to manifest and dramatically increase in proportion to speed of rotation. Diamagnetism manifests as a profoundly strong force at the upper and lower rotor faces as primarily vertical influences which, through repellent diamagnetic fields, act to drive the magnet arrays while simultaneously generating a significant rotational torque component. It has been determined that these strong force diamagnetic fields can be transmitted through/passed through insulators to other metallic materials such as aluminum and brass. These diamagnetic fields, generated at ambient temperatures, are always repellant irrespective of magnet polarity. Although mechanically generated, these diamagnetic fields are, believed to be in fact, screening and/or eddy currents previously only recognized as a strong force associated with magnetic fields as they relate to superconductors operating at cryogenic temperatures. The system is configured to rotate on the horizontal plane, resulting in the most profound magnetic field effects manifesting and emanating at an oblique, though near right angle relative to the upper and lower rotor faces. The most profound electrical outputs in the system emanate from the periphery of the disk-pack turbine and are measurable as very high field amperages and atmospheric voltages. As an example, when attaching a hand held amp meter to any of the three structural aluminum risers of the built system illustrated, for example, in FIG. 12, it is common to observe amperages of over 150 amps per electrically isolated riser. Polar/magnetic fluxes are the primary fluid acting in this system configured for electrical power generation. An additional component acting within the system is atmospheric air. In certain implementations, allowing the intake, dissociation, and discharge of the elements within atmospheric air as well as exposure to ambient atmospheric energies increases the magnetic field effects and electrical power output potential by plus/minus 40%.

The diamagnetic fields utilized for electrical power generation make it possible to orient all magnets within the magnet arrays to North, South, or in a customary North/South alternating configuration. When all North or South facing magnets are configured in relation to the diamagnetic rotor fields, voltages and frequencies realized are extremely high. With all North or South magnet orientation the diamagnetism, which is both North and South magnetic loops, provides the opposite polarity for the generation of AC electricity. By configuring the system with alternating magnetic polarities and minor power output conditioning, it has been possible to practically divide the output values and bring the voltages and frequencies into useful ranges. As an example using an earlier configuration, measuring only the three phrases of the upper coil array, output values of 900 volts at 60 HZ with a rotor speed of 1200 RPM are typical. Based on research, it is believed the magnetic fluxes behave like gasses/fluids and can act as such. The addition/intake/dissociation of air and other ambient influences adds significantly to the process; however, with the presence of magnetic and/or other ambient fields interacting with the hyperbolic waveform structures alone, it is believed that both exotic, magnetic phenomena as well as electricity are generated. It is believed it would be impossible to be generating these profound diamagnetic fields without also simultaneously generating corresponding electrical currents. As soon as a magnet, even handheld, is introduced above the disk surface and the diamagnetic repellent effect is felt, electrical current is being produced, thereby creating the diamagnetic phenomena.

e. WAVEFORM DISKS

The previously described waveforms and the one illustrated in FIGS. 8B and 8C are examples of the possibilities for their structure. The waveform patterns increase the surface area in which the charging media and fields pass over and through during operation of the system. It is believed the increased surface area as alluded to earlier in this disclosure provides an area in which the environmental fields in the atmosphere are screened in such a way as to provide a magnetic field in the presence of a magnet. This is even true when the waveform disk is stationary and a magnet is passed over its surface (either the waveform side or back side of the waveform disk), and the ebbs and flow of the magnetic field track the waveform patterns on the disk, manifesting in at least one embodiment as strong, geometric eddy currents/geometric molasses.

FIGS. 8A-8C illustrates an example of a small biaxial configuration for the disk-pack turbine, which includes an upper rotor 264A and a lower rotor 266A, was sufficient to establish repeatable, verifiable dissociation achieved through hyperbolic rotary motion alone. FIG. 8A illustrates the top of the disk-pack turbine 250A, FIG. 8B illustrates the bottom face of the upper rotor 264A, and FIG. 8C illustrates the top face of the lower rotor 266A. The illustrated waveform pattern includes a sinusoidal ridge 2642A and a circular ridge 2646A. The lower rotor 266A includes a circular outer face ridge 2668A. Also, illustrated is an example of mounting holes 2502A for assembling the disk-pack turbine 250A. In an alternative embodiment, the wave patterns are switched between the upper rotor 264A and the bottom rotor 266A. Stoichiometric gas concentrations capable of sustaining flame were achieved through broad variations in systemic configuration and operating conditions.

The previously described waveforms and the one illustrated in FIGS. 8B and 8C are examples of the possibilities for their structure. The waveform patterns increase the surface area in which the charging media and fields pass over and through during operation of the system. It is believed the increased surface area as alluded to earlier in this disclosure provides an area in which the environmental fields in the atmosphere are screened in such a way as to provide a magnetic field in the presence of a magnet. This is even true when the waveform disk is stationary and a magnet is passed over its surface (either the waveform side or back side of the waveform disk), and the ebbs and flow of the magnetic field track the waveform patterns on the disk, manifesting in at least one embodiment as strong, geometric eddy currents/geometric molasses.

As discussed above, the waveform disks include a plurality of radii, grooves and ridges that in most examples are complimentary to each other when present on opposing surfaces. In at least one example, the height in the vertical axis and/or the depth measured along a radius of the disk chambers vary along a radius as illustrated, for example, in FIG. 15D. In at least one example, when a disk surface with the waveforms on it is viewed looking towards the waveforms, the waveforms take a variety of shapes that radiate from the opening that passes through (or the ridge feature on) the disk. In at least one example, the number of peaks for each level of waveforms progressing out from the center increases, which in a further example includes a multiplier selected from a range of 2 to 8 and more particularly in at least one embodiment is 2. In at least one embodiment, the number of peaks for each level of waveforms progressing out from the center stays the same or increases by a multiplier. In at least one embodiment, the multiplier is selected to amplify and compound internal and external energy interactions and production.

FIGS. 19A-19E illustrate a variety of additional waveform examples. The illustrated plates include two different waveforms. The first waveform is a circular waveform 2646G in the center and around the periphery. The second waveform 2642G is a biaxial, sinuicircular, progressive waveform located between the two sets of circular waveforms. The illustrated disks mate together to form the disk channels 262G that extend out from the expansion chamber 252G discussed previously. Each of the disks includes a plurality of assembly flanges 2629G for mounting impellers between the disks.

Figure 19A:
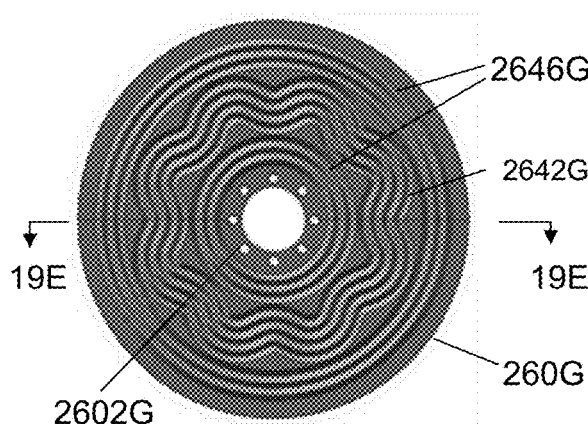
Figure 19B:
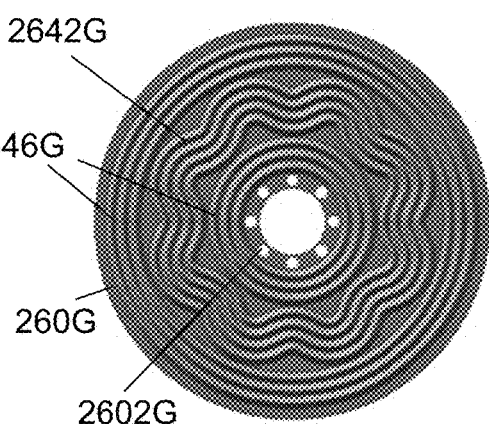
Figure 19C:
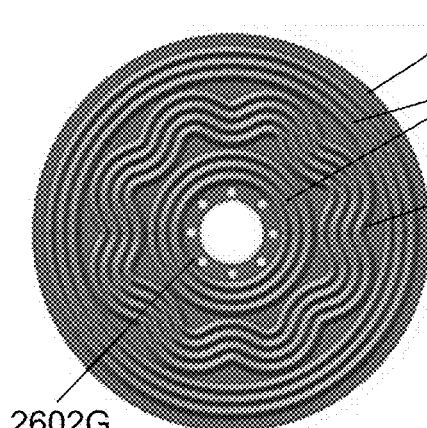
Figure 19D:
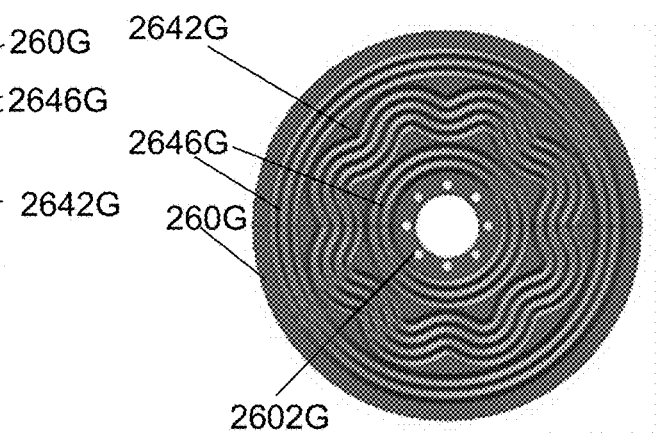
Figure 19E:
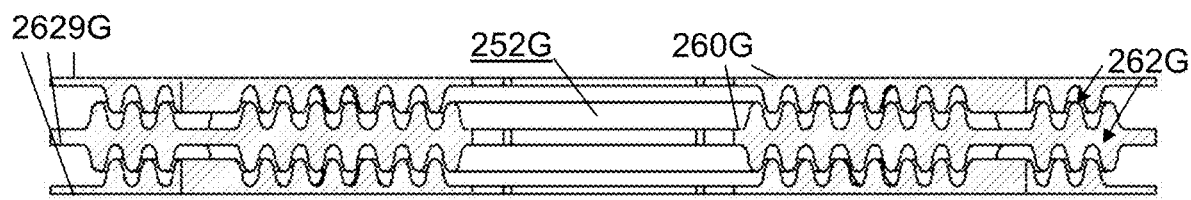

FIG. 19A illustrates an example combination of biaxial, sinucircular, progressive, and concentric sinusoidal progressive waveform geometry on a disk 260G according to the invention. FIGS. 19B and 19C illustrate respectively the opposing sides of the middle disk 260G. FIG. 19D illustrates the top surface of the bottom disk 260G. FIG. 19E illustrates how the three disks fit together to form the disk chambers 262G and the expansion chamber 252G of a disk-pack turbine. In an alternative embodiment, one or more of the circular waveforms is modified to include a plurality of biaxial segments.

FIG. 20 illustrates an example of a center disk incorporating varied biaxial geometries between two sets of circular waveforms according to the invention.

Figure 21A:
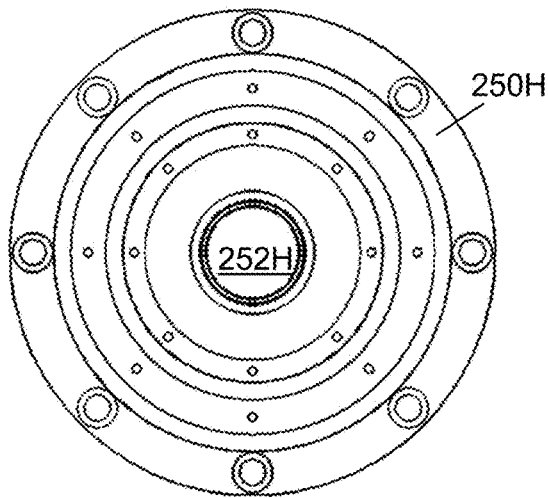
Figure 21B:
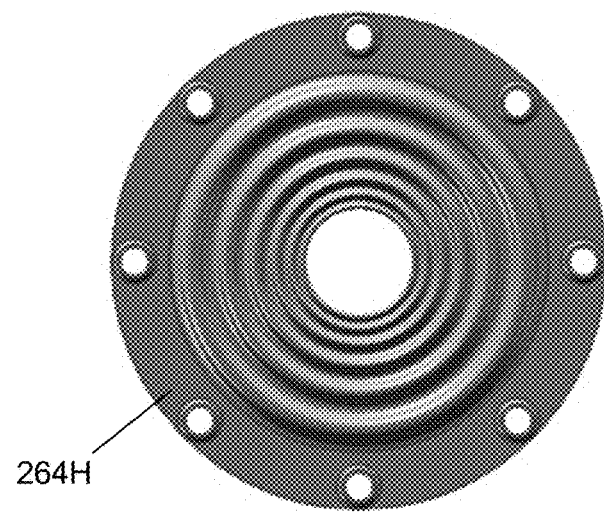
Figure 21C:
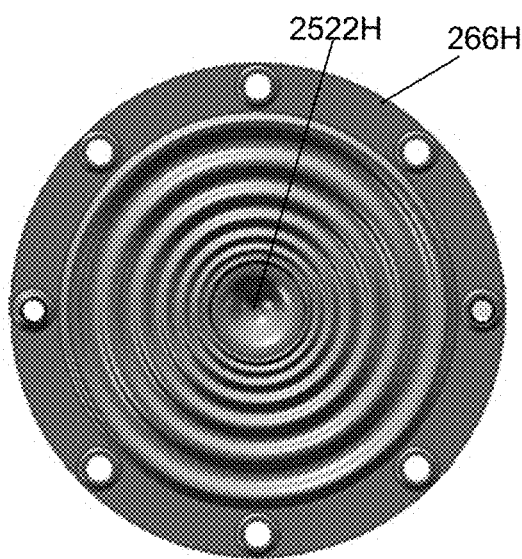
Figure 21D:
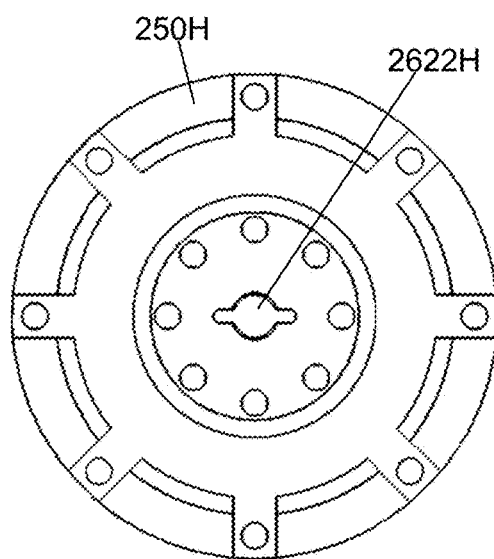

FIGS. 21A-21D illustrate a disk-pack turbine 250H with two disks. FIG. 21A illustrates the top of the disk-pack turbine 250H with an expansion chamber 252H. FIG. 21B illustrates the bottom surface of the top disk 264H. FIG. 21C illustrates the top surface of the bottom disk 266H including the concave feature 2522H that provides the bottom of the expansion chamber 252H in the disk-pack turbine 250H. FIG. 21D illustrates the bottom of the disk-pack turbine 250H including an example of a motor mount 2622H. The illustrated waveforms are circular, but as discussed previously a variety of waveforms including hyperbolic waveforms can be substituted for the illustrated circular waveforms.

FIG. 22 illustrates another example of a disk-pack turbine 250I with a top rotor 264I, a disk 260I, and a bottom rotor 266I. The top rotor 264I and the disk 260I are shown in cross-section with the plane taken through the middle of the components. FIG. 23 also illustrates an embodiment where the components are attached around the periphery of the opening that defines the expansion chamber 252I through mounting holes 2502I. Each of the waveform patterns on the top rotor 264I, the disk 260I, and the bottom rotor 266I includes two sets of circular waveforms 2646I and one set of hyperbolic waveforms 2642I.

In at least one example, the disk surfaces having waveforms present on it eliminates almost all right angles and flat surfaces from the surface such that the surface includes a continuously curved face.

In at least one example, at least one ridge includes a back channel formed into the outer side of the ridge that together with the complementary groove on the adjoining disk define an area having a vertical oval cross-section.

In at least one embodiment, one or more waveform disks used in a system include other surface features in addition to the waveforms.

Based on this disclosure, it should be appreciated that the described motor mounts could be modified to work with a rotor having an axially centered opening. The illustrated waveforms can be used on the different illustrated rotors and/or disks. In at least one embodiment, the waveforms are incorporated into one or more rotors instead of having the rotors nest a disk.

In a further embodiment, the orientation of the system is reversed where the motor and the driveshaft are above the disk pack turbine or there is a horizontal alignment. Based on this disclosure, it should be understood other orientations are possible with, for example, the axial center being angled relative to the horizon (or a horizontal plane).

f. DISCUSSION REGARDING DIAMAGNETISM

Diamagnetism has generally only been known to exist as a strong force from the screening currents that occur in opposition to load/current within superconductors operating at super low cryogenic temperatures, i.e., 0 degrees Kelvin (0 K) or −273 degrees Celsius (−273 C). When a superconductor-generated diamagnetic field is approached by a magnetic field (irrespective of polar orientation) a resistive/repulsive force resists the magnetic field with ever-increasing repulsive/resistive force as distance of separation decreases. The superconductor's resistive force is known to rise, in general, in a direct one-to-one ratio relative to the magnetic force applied. A 100 pound magnet can expect 100 pounds of diamagnetic resistance. A logical assumption would lead one to believe that this diamagnetic force, acting upon a superconductor in this way, would result in increases in systemic resistance and net losses in efficiency. The counter-intuitive reality is that this interaction results in a zero net loss to the system.

As described above, diamagnetism manifests as a strong force in superconductors due to the screening currents that occur at cryogenic temperatures. As with superconductors, the system of the present invention in at least one embodiment, utilizes screening currents working in concert with internal oppositional currents, flows, counter-flows, reciprocating flows and pressures generated by hyperbolic waveforms present on the rotatable waveform disks. These forces in combination with specific metallic materials, material relationships, component isolation technologies, and charging media as discussed in the example embodiments above manifest as profoundly powerful diamagnetic fields at the bottom and top surfaces of the rotatable disk-pack turbine at ambient temperatures. The diamagnetic waveform disks are fabricated from non-magnetic materials that are incapable of maintaining/retaining a residual electric field in the absence of an applied charge. The diamagnetic fields created by the rotatable waveform disks are a direct product of the specialized waveform motions, interaction with environmental matter and energies, and a modest amount of through-flowing and centripitated ambient air.

The diamagnetic fields generated by the waveform disks can be utilized as a substitute for the North or South magnetic poles of permanent magnets for the purpose of generating electricity. However, unlike the North/South lines of force exhibited by common magnetic fields, diamagnetic fields manifest as North/South loops or tori that spin around their own central axis. This distinction results in the diamagnetic field not being a respecter of magnetic polarity and always repellent. The magnetic repellency allows one pole of the north/south alternating magnetic fields to be substituted with the diamagnetic field generated by the waveform disks. In use, the upper array of magnets and the lower array of magnets float freely and are driven by the diamagnetic levitative rotational torque. As the all north-facing rare earth magnets cut a circular right-angle path over the upper array of coils, and lower array of coils, electrical power is generated.

Systems utilizing this arrangement for electrical power generation, in at least one embodiment of the present invention, have realized a multiplication in the production of voltage and current as compared to an electrical power generation arrangement utilizing traditional North to South pole fluxuations. Further, power input required to run the systems are extremely low while power production is accomplished with minimal rise in heat or resistance, e.g., systems temperatures of less than five degrees over ambient temperatures. Also, when a coil or circuit is placed into the diamagnetic field, the resistance drops to near 0 Ohms with actual repeatable readings being about 0.01.

Further, in at least one embodiment, the system of the present invention is capable of producing at very low operational speeds powerful diamagnetic fields that are capable of functioning as an invisible coupling between a rotating waveform disk and a rotatable magnetic array. The system drive side may be either the magnetic array side of the system or the diamagnetic disk side of the system. The magnets may move over the internal waveform geometries, thereby causing the fields to arise, or vise-versa. Actual power/drive ratios are established via progressive waveform amplitude and waveform iterations. The magnetic drive array will allow for the magnets to be dynamically/mechanically progressed toward periphery as systemic momentum increases and power requirements decrease. Conversely, when loads increase, the systemic driving magnets will migrate toward higher torque/lower speed producing geometries.

g. TESTING OF A PROTOTYPE DISK-PACK TURBINE SYSTEM

At least one prototype has been built to test the operation of the system and to gather data regarding its operation. The flux field generators illustrated in FIGS. 12-18 include a three phase arrangement of nine coils, three coils per phase using 16 gauge copper magnet wire with 140 turns and six magnets (three North and three South magnets alternating with each other) above the disk-pack turbine and coils. On the bottom side of the disk-pack turbine there is a four phase arrangement of 12 coils, three coils per phase using 18 gauge copper magnet wire with 260 turns and six magnets. Based on this disclosure, it should be appreciated that the gauge and material of the wire and the number of turns and of coils can be modified and that the above descriptions are examples. The disk-pack turbine was assembled with two pairs of mated disks between the top rotor and the bottom rotor as illustrated, for example, in FIG. 16. In this particular configuration the two top waveform disks were made of aluminum and the bottom two waveform disks were made of brass. It has been found that alternating brass and aluminum disks, as opposed to nesting like disks results in significantly higher magnetic and electrical values being produced. In further testing when copper is used in place of brass, the voltages have stayed substantially equal, but a much higher current has been produced. After one testing session, it was discovered that the brass disks were not electrically isolated from each other and there was still excess electrical power generated compared to the power required to run the motor. The feed tube (or intake chamber) in at least one embodiment is made of brass and/or non-magnetic stainless steel and electrically isolated from the aluminum rotor face through use of a non-conductive isolation ring, which also is present between the two mated disk pairs. The system was connected to a motor via a belt.

When the motor was not running, and the disk-pack turbine was slowly rotated by hand, even at this very low speed, a diamagnetic field arose sufficient to engage the upper magnet plate (the magnet plate was not mechanically coupled), resulting in the production of enough electricity to cause a connected three-phase motor (2 HP, 230 V) to rotate as the disk-pack turbine was being turned by hand from the current produced in the coil arrays.

The lower magnet disk rotated with the disk-pack turbine while the upper magnet disk was magnetically coupled to the waveform disks. One way to illustrate the results will be to use classic power generation formulas. One of the greatest points of interest is that, even though there is, mathematically speaking, production of very high power readings as relates to watts, there is very little discernible heat generated through the process as a result of negligible resistance resulting from the diamagnetic fields, and this phenomenon extends to devices connected and driven by this electricity, such as multiple three-phase high voltage electric motors. An example is prior to starting the system, ambient temperatures for the induction coils and other associated devices were about 82° Fahrenheit. After running the system for in excess of one hour, the temperature rise was as little as two or three degrees and, at times, the temperature has been found to actually fall slightly. The temperature measured at the core of the waveform rotor when measured always has dropped a few degrees over time. The temperature of a three phase electric motor connected to the output will generally remain within one or two degrees of coil temperature. The three phases of the upper generating assembly were measured with each phase was producing approximately 200 volts at 875 RPM. Based on measurements, each of the three coil sets in the three-phase system measure out at 1.8 ohms. Divide 200 volts from one phase by 1.8 ohms equals about 111.11 Amps. The amperage of 111.11 Amps is multiplied by 200 volts multiplied by 1.732 (root mean square (RMS) factor for AC power) multiplied by cosine/Power Factor, which is usually around 1, divided by 1000 to obtain about 38.485 kW. The motor powering the system was drawing approximately 10.5 Amps with a line voltage of 230 volts, which yields 2,415 Watts being consumed by the motor to produce this output of about 38 kW. Similar phenomena have been observed when the AC power produced by the system is rectified into DC power and supplied to a DC load.

When the top magnet disk was locked with the waveform disks such that they rotate together as driven by the drive system, the process was repeated. The upper coil array produced about 540 Volts peak-to-peak between the three phases (or about 180 Volts per phase) and about 100 Amps for a power generation using the formula from the prior paragraph of about 31 kW. With regard to the lower generator, the math is actually quite different because there is a higher coil set resistance of approximately 3.7 Ohms per coil set of three coils (four phases). Each phase was producing 120 Volts peak-to-peak, which is using a simplified approach of voltage squared divided by resistance results in almost 3.9 kW per phase. Testing has found that diamagnetic energy will really start to rise at 1700 RPM and up as do the corresponding electrical outputs. The coils in these sets after further use have had their resistance lowered to negligible levels when read with an ohm meter.

Changing the material used for the intake chamber in the built system from D2 steel to brass improved the strength of the diamagnetic field and resulting power generation by approximately 30%.

The use of a flux return made from bismuth, copper, iron, or steel or a combination of these has resulted in a reorientation of the fields produced by the flux field generator. In at least one further embodiment, the flux return includes at least steel or iron For example, a one-eighth inch thick bismuth plate was placed above the disk-pack turbine on a Plexiglas shelf. The plate had sufficient diameter to cover the waveform geometries present in the disk-pack turbine. The push and torque forces felt when placing a magnet over the disk-pack turbine were redirected to the sides of the disk-pack turbine to increase the diamagnetic field to the periphery while substantially blocking the diamagnetic field above the bismuth plate. In addition, measured amperages at the bottom edge of the disk-pack turbine and in the environment around the disk-pack turbine increased. When the bismuth plate was attached with adhesive tape to the top of the disk-pack turbine, there were similar or better results obtained, but interestingly the bismuth was still and exhibited no signs of being impacted by the diamagnetic fields being redirected and/or shaped.

Another example is that when a copper plate was placed into the system above the disk-pack turbine, the field effect around the periphery and below the disk-pack turbine increased by approximately 25%. When a bismuth and/or steel plate were added, there was still an increase. Both the bismuth and copper plates when used individually cause an increase in the diamagnetic fields being projected laterally from the disk-pack turbine with a very good combination being to use a copper plate and a bismuth plate above the disk-pack turbine.

FIG. 23 illustrates how power may be pulled from the flux field generator 85 with a coil array having three AC phases and a magnet plate and how the power may be conditioned for storage in a battery bank 87', which in turn is able to power the DC motor M that is used to rotate the disk-pack turbine in the flux field generator 85. In the built test bed, the motor M drove the disk-pack turbine through a mechanical linkage that included a belt. The illustrated example of the test bed includes a battery bank 87', which could be a capacitor bank instead or in addition, a DC motor M, a three phase rectifier 50 such as a full wave bridge rectifier in parallel with a capacitor C1, and a pair of rheostats R1, R2. The flux field generator 85 was configured to provide a three phase output to the rectifier 50 that than produced a DC signal that passed through the rheostat R1, which allowed for control of the voltage provided for battery charging, to the battery bank 87', which in the test bed included twelve 12-volt batteries connected in series and in another test bed included twelve sets of three 12-volt batteries in parallel to the other batteries in the set. Based on this disclosure, it should be appreciated that the battery bank could take a variety of configurations. The battery bank 87' was connected to the negative terminal of the motor M and the rectifier 50. The positive terminal of the battery bank 87' connected to the positive terminal of the motor M through a rheostat R2, which provided motor speed control. The various illustrated diodes D and capacitors C1, C2 are provided for illustration purposes and may be adjusted while still having the overall function of the circuit provided and in at least one embodiment capacitors are placed in series prior to the motor M and/or the battery bank 87'. The illustrated test bed was used to run the experiments resulting in the data shown in FIGS. 24A-24C and 25. In testing, the power into the battery bank 87' has been greater than the power used to run the system as demonstrated by the data in FIGS. 24A-24C.

Testing was performed using a disk-pack turbine with three pairs of waveform disks with copper separation plates placed between neighboring pairs of waveform disks produced the data contained in FIGS. 24A-24C. The waveform disks (top to bottom) were made from brass, aluminum, aluminum, aluminum, aluminum, and copper. The top waveform pair includes the presence of compression/decompression areas around the periphery of the waveform disk pair. The system also included a steel flux return above the magnet plate. The waveform disks were rotated using a 1.5 HP drive motor connected to a dial controller and a bank of batteries rated for 12 Volts and as such was not connected to wall power or any other power source.

There were three test runs performed with each having a different load being connected to the prototype system. For each test run, the temperature of the room and of a motor, which temperature was also recorded at the end of each test run, were taken at the start. In addition, the net standing voltage of the battery bank was measured using a multimeter. During each test run there was a first reading taken after the system had stabilized (first read) and an end reading proximate the end of the test run at 30 minutes (end read). The device motor measurements and output measurements were taken from power meters with one power meter on the input side of the drive motor and the other power meter on a rectified DC output that was used to recharge the battery and to run the system. All three phases were rectified through dual three phase, full-wave bridge rectifiers and all three phases were included to produce the DC output. The load measurements were taken from a power meter (e.g., connected 1 HP DC motor (rated at 1750 RPM) free-running) or calculated (e.g., the electrolytic cell). A common occurrence in each of the test runs was that the temperature of motors running on power from the system decreased and the voltage reading for the battery bank increased during the 30 minute test run. The system takes a few moments after it starts up and the load is present to stabilize itself, after which time the system produces voltages typically within a window of plus or minus 0.3 V variation over time. The drive motor temperatures were higher than ambient temperature in part using power originating from the wall. Typically, when the system is using power from the battery bank, which was previously charged by the system, the drive motor will stay within about 5 degrees Fahrenheit of ambient temperature.

The data for the first test run is depicted in FIG. 24A. The first test run used a 1 HP DC motor free-running as a load in addition to the recharging of the battery bank. Taking the watts readings for the outputs (output measurement, which represents voltage provided to the battery bank and the drive motor), the load measurement, and the drive motor measurements at the end, the differential in watts is 1339.1 W. Comparing the beginning and end voltage readings for the battery bank resulted in an increase of 0.3 V in the battery bank. A temperature reading of the battery bank at the end of the test run was 74.6 degrees Fahrenheit.

The data for the second test run is depicted in FIG. 24B. The load that was placed on the prototype system included an electrolytic cell and substantially continuous maintenance of a plasma arc over the 30 minute test run. The electrolytic cell included 584 ounces of water catalyzed with sulfuric acid to an adjusted pH of 3.00. The plasma arc was pulled between a positive copper electrode connected to the positive output of the system and an alligator clamp communicating electrically through the electrolytic fluid to the positive pole/static plate of the plasma arc puller, which was partially submerged in the electrolyte cell fluid. The negative pole/cable and alligator clamp were connected to an articulated arm of the plasma arc puller that was configured to pull vertical plasma arcs. The catalytic cell was activated once a continuous plasma arc was established, thus providing both an electrolytic cell and plasma arc system load to the system being tested. The selected electrodes for the plasma arc puller were carbon-steel positive and carbon-graphite at the negative. Taking the watts readings for the outputs (output measurement, which represents voltage provided to the battery bank and the drive motor), the load measurement, and the drive motor measurements at the end, the differential in watts is 548.6 W. Comparing the beginning and end voltage readings for the battery bank resulted in an increase of 0.6 V in the battery bank. A temperature reading of the battery bank at the end of the test run was 75 degrees Fahrenheit.

The data for the third test run is depicted in FIG. 24C. The load that was placed on the system was an electrolytic cell. The electrolytic cell for the second and third test runs had a similar structure, but the electrolytic cell had a pH of 5.31 for the third test run. Taking the watts readings for the outputs (output measurement, which represents voltage provided to the battery bank and the drive motor), the load measurement, and the drive motor measurements at the end, the differential in watts is 1281 W. Comparing the beginning and end voltage readings for the battery bank resulted in an increase of 0.8 V in the battery bank. A temperature reading of the battery bank at the end of the test run was 74.6 degrees Fahrenheit.

FIG. 25 illustrates data that was gathered from an experiment using two new BlackBerry PlayBooks as the testing objects. During each of the runs a video from YouTube was repeatedly played. The original run time was based on the Playbooks being charged using wall power to determine their length of run time. After the initial run time, PlayBook 1 was recharged using AC power generated by a prototype system illustrated in FIG. 23, while PlayBook 2 was recharged using power from a DC inverter connected to the rectified power in the system illustrated in FIG. 23. Each of the tests produced longer running times for the respective PlayBook, with run time for test 1 for PlayBook 1 being impacted by the circumstance that it was on standby overnight and used approximately 8% of the battery charge before the run time test was started.

In other battery testing that occurred with rechargeable AA batteries, it has been found that their run time have also been increased after they have been recharged using power generated by a prototype system.

In a battery test involving an iPod 4, the run time appears to be within about 30 minutes of original time. The difference was that there was a reduction in charging time of about 3.5 hours (e.g., about 9 hours down to about 5.5 hours) when the iPod after having multiple charging cycles using power generated by a prototype system was returned to charging from wall power.

Another occurrence that has been noticed antidotally is that the electronics seem to operate and charge cooler after being exposed to power generated by a test system.

h. CONCLUSION

While the invention has been described with reference to certain embodiments, numerous changes, alterations and modifications to the described embodiments are possible without departing from the spirit and scope of the invention, as defined in the appended claims and equivalents thereof. The number, location, and configuration of disks and/or rotors described above and illustrated are examples and for illustration only. Further, the terms disks and rotors are used interchangeably throughout the detailed description without departing from the invention.

As used above "substantially," "generally," and other words of degree are relative modifiers intended to indicate permissible variation from the characteristic so modified. It is not intended to be limited to the absolute value or characteristic which it modifies but rather possessing more of the physical or functional characteristic than its opposite, and preferably, approaching or approximating such a physical or functional characteristic.

The foregoing description describes different components of embodiments being "connected" to other components. These connections include physical connections, fluid connections, magnetic connections, flux connections, and other types of connections capable of transmitting and sensing physical phenomena between the components.

The foregoing description describes different components of embodiments being "in fluid communication" to other components. "In fluid communication" includes the ability for fluid to travel from one component/chamber to another component/chamber.

Although the present invention has been described in terms of particular embodiments, it is not limited to those embodiments. Alternative embodiments, examples, and modifications which would still be encompassed by the invention may be made by those skilled in the art, particularly in light of the foregoing teachings. The example and alternative embodiments described above may be combined in a variety of ways with each other without departing from the invention.

Those skilled in the art will appreciate that various adaptations and modifications of the embodiments described above can be configured without departing from the scope and spirit of the invention. Therefore, it is to be understood that, within the scope of the appended claims, the invention may be practiced other than as specifically described herein.

I claim:

1. A disk-pack turbine comprising:
   at least one pair of mated disks, said mated disks are substantially parallel to each other, each disk having
      a top surface,
      a bottom surface,
      a waveform pattern on at least one surface of the disk facing a neighboring disk such that a passageway is formed with the neighboring waveform pattern of said neighboring disk in said pair of mated disks, said waveform pattern is centered about a center of said disk; and
   each of said waveform patterns includes at least one hyperbolic waveform having plural amplitudes that vary when measured in the radial direction along the hyperbolic waveform, and
   at least one of said disks includes an opening axially centered to said disks configured to provide a path for fluid to flow through the at least one of said disks into said passageway, and
   wherein each waveform pattern includes at least one biaxial waveform centered about the at least one opening of the disk-pack turbine and at least one multiple axial sinusoidal waveform.

2. The disk-pack turbine according to claim 1, wherein a plurality of disks have an opening passing therethrough with at least two disks having openings with different diameters.

3. The disk-pack turbine according to claim 1, wherein each waveform pattern includes a plurality of rising waveforms as protrusions and a plurality of descending waveforms as depressions, said plurality of rising waveforms and descending waveforms traveling substantially around and substantially axially centered about the at least one opening of the disk-pack turbine.

4. The disk-pack turbine according to claim 1, wherein the passageway formed between disks of each pair includes a substantial portion of the surface with the waveform pattern.

5. The disk-pack turbine according to claim 1, wherein each disk surface facing another disk includes the waveform pattern.

6. The disk-pack turbine according to claim 1, further comprising at least one additional disk between said disks of said at least one mated pair, each additional disk includes
   a top surface,
   a bottom surface, a waveform pattern on said top surface and said bottom surface such that a passageway is formed by the neighboring waveform patterns between said neighboring disks within said mated disks, and an opening passing from said top surface to said bottom surface.

7. The disk-pack turbine according to claim 1, further comprising:

a top rotor attached to one mated disk, a bottom rotor attached to a second mated disk from a second pair of mated disks, and wherein said at least one pair of mated disks numbers at least three pairs of mated disks.

8. The disk-pack turbine according to claim 1, wherein each disk includes a horizontal plane through it through which each waveform pattern on said disk does not intersect.

9. A disk-pack turbine comprising:

at least two pairs of mated disks, said mated disks of each pair are substantially parallel to each other, each disk having a top surface, a bottom surface, a waveform pattern on at least one surface of the disk facing a neighboring disk such that a passageway is formed with the neighboring waveform pattern of said neighboring disk in said pair of mated disks, said waveform pattern is centered about a center of said disk; and each of said waveform patterns includes at least one hyperbolic waveform having plural amplitudes that vary when measured in the radial direction along the hyperbolic waveform, at least one of said disks includes an opening axially centered to said disks configured to provide a path for fluid to flow through the at least one of said disks into said passageway, and wherein there are two pairs of mated disks with the top three disks each having at least one axially centered opening and said bottom disk having an expansion chamber bottom area aligned with the openings passing through the top three disks to define an expansion chamber between the openings passing through the top three disks and said expansion chamber bottom.

10. The disk-pack turbine according to claim 9, further comprising:

a top rotor attached to one mated disk, a bottom rotor attached to a second mated disk from a second pair of mated disks, and wherein said at least two pairs of mated disks numbers at least three pairs of mated disks.

11. The disk-pack turbine according to claim 9, wherein each disk includes a horizontal plane through it through which each waveform pattern on said disk does not intersect, and the passageway formed between disks of each pair includes a substantial portion of the surface with the waveform pattern.

12. The disk-pack turbine according to claim 9, wherein each disk includes a horizontal plane through it through which each waveform pattern on said disk does not intersect.

13. The disk-pack turbine according to claim 9, wherein the passageway formed between disks of each pair includes a substantial portion of the surface with the waveform pattern.

14. A disk-pack turbine comprising:

at least one pair of mated disks, said mated disks are substantially parallel to each other, each disk having a top surface, a bottom surface, a waveform pattern on at least one surface of the disk facing a neighboring disk such that a passageway is formed with the neighboring waveform pattern of said neighboring disk in said pair of mated disks, said waveform pattern is centered about a center of said disk; and each of said waveform patterns includes at least one hyperbolic waveform having plural amplitudes that vary when measured in the radial direction along the hyperbolic waveform, at least one of said disks includes an opening axially centered to said disks configured to provide a path for fluid to flow through the at least one of said disks into said passageway, and wherein a diameter taken along the surface of the disk on which said waveform pattern is present intersects the waveform pattern twice.

15. The disk-pack turbine according to claim 14, wherein there are two pairs of mated disks with the top three disks each having at least one opening and said bottom disk having an expansion chamber bottom area aligned with the openings passing through the top three disks to define an expansion chamber.

16. The disk-pack turbine according to claim 14, further comprising:

a top rotor attached to one mated disk, a bottom rotor attached to a second mated disk from a second pair of mated disks, and wherein said at least two pairs of mated disks numbers at least three pairs of mated disks.

17. The disk-pack turbine according to claim 14, wherein each disk includes a horizontal plane through it through which each waveform pattern on said disk does not intersect.

18. The disk-pack turbine according to claim 14, wherein the passageway formed between disks of each pair includes a substantial portion of the surface with the waveform pattern.

19. The disk-pack turbine according to claim 18, wherein each disk includes a horizontal plane through it through which each waveform pattern on said disk does not intersect.

20. The disk-pack turbine according to claim 14, wherein said disks are formed of at least one material is selected from the group consisting of aluminum, brass, stainless steel, carbon fiber, copper, magnesium, non-ferrous material alloys, and non-ferrous material alloys containing of bismuth.

* * * * *

UNITED STATES PATENT AND TRADEMARK OFFICE
CERTIFICATE OF CORRECTION

Page 1 of 1

PATENT NO. : 10,790,723 B2
APPLICATION NO. : 13/783037
DATED : September 29, 2020
INVENTOR(S) : Whitaker Ben Irvin, Sr.

It is certified that error appears in the above-identified patent and that said Letters Patent is hereby corrected as shown below:

In the Claims

At Column 32, Line 53, delete "is".

At Column 32, Line 56, delete "of".

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*